United States Patent
Chun et al.

(10) Patent No.: US 8,512,663 B2
(45) Date of Patent: *Aug. 20, 2013

(54) PYROLYSIS REACTOR MATERIALS AND METHODS

(75) Inventors: ChangMin Chun, Belle Mead, NJ (US); Frank Hershkowitz, Liberty Corner, NJ (US)

(73) Assignee: ExxonMobile Chemical Patents Inc., Houston, TX (US)

( * ) Notice: Subject to any disclaimer, the term of this patent is extended or adjusted under 35 U.S.C. 154(b) by 835 days.

This patent is subject to a terminal disclaimer.

(21) Appl. No.: 12/467,832

(22) Filed: May 18, 2009

(65) Prior Publication Data

US 2010/0290978 A1  Nov. 18, 2010

(51) Int. Cl.
- B01J 19/02 (2006.01)
- C01F 17/00 (2006.01)
- C01G 25/02 (2006.01)
- C04B 35/482 (2006.01)
- C04B 35/505 (2006.01)

(52) U.S. Cl.
USPC ............ 423/263; 423/608; 422/240; 501/103

(58) Field of Classification Search
USPC ................. 423/608, 263; 422/240; 501/103
See application file for complete search history.

(56) References Cited

U.S. PATENT DOCUMENTS

| | | |
|---|---|---|
| 1,064,447 A | 6/1913 | Cross |
| 1,723,679 A | 8/1929 | Coberly et al. |
| 1,843,965 A | 2/1932 | Wulff |
| 1,880,306 A | 10/1932 | Wulff |
| 1,880,307 A | 10/1932 | Wulff |
| 1,880,308 A | 10/1932 | Wulff |
| 1,880,309 A | 10/1932 | Wulff |
| 1,880,310 A | 10/1932 | Wulff |
| 1,917,627 A | 7/1933 | Wulff |
| 1,938,991 A | 12/1933 | Wulff |
| 1,966,185 A | 7/1934 | Preisman |
| 1,966,779 A | 7/1934 | Wulff |
| 1,996,185 A | 4/1935 | Wulff |
| 2,037,056 A | 4/1936 | Wulff |
| 2,160,170 A | 5/1939 | Martin et al. |
| 2,319,579 A | 8/1939 | Black |
| 2,236,534 A | 4/1941 | Hasche |
| 2,236,555 A | 4/1941 | Wulff |
| 2,319,679 A | 4/1942 | Hasche et al. |
| 2,343,866 A | 3/1944 | Hincke |
| 2,558,861 A | 7/1951 | Liggett |
| 2,580,766 A | 1/1952 | Hall |
| 2,645,673 A | 7/1953 | Hasche |
| 2,678,339 A | 5/1954 | Harris |
| 2,692,819 A | 10/1954 | Hasche et al. |
| 2,706,210 A | 4/1955 | Harris |
| 2,718,534 A | 9/1955 | Harris |
| 2,790,838 A | 4/1957 | Schrader |
| 2,796,951 A | 6/1957 | Bogart |
| 2,813,919 A | 11/1957 | Pearce |
| 2,830,677 A | 4/1958 | Coberly |
| 2,845,335 A | 7/1958 | Hasche |
| 2,851,340 A | 9/1958 | Coberly et al. |
| 2,885,455 A | 5/1959 | Hennig |
| 2,886,615 A | 5/1959 | Lindahl |
| 2,920,123 A | 1/1960 | Oldershaw et al. |
| 2,921,100 A | 1/1960 | Pettyjohn et al. |
| 2,956,864 A | 10/1960 | Coberly |
| 2,967,205 A | 1/1961 | Coberly |
| 3,024,094 A | 3/1962 | Coberly |
| 3,093,697 A | 6/1963 | Kasbohm et al. |
| 3,156,733 A | 11/1964 | Happel et al. |
| 3,156,734 A | 11/1964 | Happel |
| 3,555,685 A | 1/1971 | Loge |
| 3,796,768 A | 3/1974 | Starzenski et al. |
| 4,176,045 A | 11/1979 | Leftin et al. |
| 4,200,682 A | 4/1980 | Sederquist |
| 4,240,805 A | 12/1980 | Sederquist |
| 4,256,565 A | 3/1981 | Friedman et al. |

(Continued)

FOREIGN PATENT DOCUMENTS

| | | |
|---|---|---|
| BE | 491 423 | 10/1949 |
| CA | 306 263 | 12/1930 |

(Continued)

OTHER PUBLICATIONS

Thiele, E.S., L.S. Wang, T.O. Mason and S.A. Barnett, "Deposition and properties of yttria-stabilized zirconia thin films using reactive direct current cagnetron sputtering," J. Vac. Sci. Technol. A, vol. 9, Issue 6 (1991), pp. 3054-3060.*

Bartholome, V.E., "*Methods of Energy Addition for Endothermic Gas Reactions at High Temperatures*", Zeitschrift fuer Elektrochemie und Angewandte Physikalische Chemie, 57, pp. 497-502 (1953).

Basu, B. et al., "*Microstructure-toughness-wear relationship of tetragonal zirconia ceramics*", Journal of the European Ceramic Society, Elsevier Ltd., vol. 24, pp. 2031-2040 (2004).

Bixler, G.H. et al. "*Wulff Process Acetylene*", Journal of Industrial and Engineering Chemistry, Washington, D.C., 45, pp. 2596-2606 (1953).

Bogart, M.J.P. et al., "*Recent Developments in Wulff Acetylene*", Chemical Engineering Progress, 50, pp. 372-375 (1954).

(Continued)

*Primary Examiner* — Stanley Silverman
*Assistant Examiner* — Diana J Liao

(57) ABSTRACT

In one aspect, the invention includes a refractory material for a pyrolysis reactor for pyrolyzing a hydrocarbon feedstock, the refractory material comprising an yttria stabilized zirconia, the refractory material comprising at least 21 wt. % yttria based upon the total weight of the refractory material. In another aspect, this invention includes a method for mitigating carbide corrosion while pyrolyzing a hydrocarbon feedstock at high temperature using a pyrolysis reactor system comprising the steps of: (a) providing a pyrolysis reactor system comprising stabilized zirconia in a heated region of the reactor, the stabilized zirconia including at least 21 wt. % yttria and having porosity of from 5 vol. % to 28 vol. %; (b) heating the heated region to a temperature of at least 1500° C.; and (c) pyrolyzing a hydrocarbon feedstock within the heated region.

21 Claims, 3 Drawing Sheets

(56) References Cited

U.S. PATENT DOCUMENTS

| | | | |
|---|---|---|---|
| 4,264,435 | A | 4/1981 | Read, Jr. et al. |
| 4,536,603 | A | 8/1985 | Sprouse et al. |
| 4,748,138 | A | 5/1988 | Watanabe et al. |
| 4,754,095 | A | 6/1988 | Coughenour et al. |
| 4,787,439 | A | 11/1988 | Feagin |
| 4,929,789 | A | 5/1990 | Gupta et al. |
| 4,973,777 | A | 11/1990 | Alagy et al. |
| 5,068,486 | A | 11/1991 | Han et al. |
| 5,138,113 | A | 8/1992 | Juguin et al. |
| 5,723,393 | A | 3/1998 | Majumdar et al. |
| 5,886,056 | A | 3/1999 | Hershkowitz et al. |
| 5,935,489 | A | 8/1999 | Hershkowitz et al. |
| 5,976,352 | A | 11/1999 | Busson et al. |
| 6,027,635 | A | 2/2000 | Busson et al. |
| 6,076,487 | A | 6/2000 | Wulff et al. |
| 6,228,293 | B1 | 5/2001 | Kriegsmann et al. |
| 6,287,351 | B1 | 9/2001 | Wulff et al. |
| 6,322,760 | B1 | 11/2001 | Busson et al. |
| 6,365,792 | B1 | 4/2002 | Stapf et al. |
| 6,575,147 | B2 | 6/2003 | Wulff et al. |
| 6,632,351 | B1 | 10/2003 | Ngan et al. |
| 6,930,066 | B2 * | 8/2005 | Subramanian ............... 501/103 |
| 7,288,127 | B1 | 10/2007 | Wulff et al. |
| 7,348,287 | B2 | 3/2008 | Mechnich |
| 7,731,776 | B2 | 6/2010 | Chun et al. |
| 7,815,873 | B2 | 10/2010 | Sankaranarayanan et al. |
| 7,846,401 | B2 | 12/2010 | Hershkowitz et al. |
| 7,914,667 | B2 | 3/2011 | Keusenkothen et al. |
| 7,976,797 | B2 | 7/2011 | Chun et al. |
| 2002/0020113 | A1 | 2/2002 | Kennedy et al. |
| 2003/0109372 | A1 | 6/2003 | Hasegawa et al. |
| 2006/0273005 | A1 | 12/2006 | Love et al. |
| 2007/0191664 | A1 | 8/2007 | Hershkowitz et al. |
| 2009/0008292 | A1 | 1/2009 | Keusenkothen et al. |
| 2010/0288617 | A1 | 11/2010 | Hershkowitz et al. |
| 2010/0290978 | A1 | 11/2010 | Chun et al. |

FOREIGN PATENT DOCUMENTS

| | | |
|---|---|---|
| EP | 1 386 665 | 2/2004 |
| FR | 841 410 | 2/1939 |
| FR | 1 588 738 | 4/1970 |
| GB | 763675 | 12/1956 |
| GB | 830 574 | 3/1960 |
| GB | 855 764 | 12/1960 |
| GB | 972153 | 10/1964 |
| GB | 1064447 | 4/1967 |
| GB | 1149798 | 4/1969 |
| GB | 959818 | 6/1994 |
| JP | 06-128033 | 5/1994 |
| JP | 2005-314144 | 11/2005 |
| RU | 2249570 | 4/2005 |
| WO | WO 01/70913 | 9/2001 |
| WO | 2004-087609 | 10/2004 |
| WO | WO 2007/075945 | 7/2007 |

OTHER PUBLICATIONS

Bogart, M.J.P. et al., "*The Wulff Process for Acetylene from Hydrocarbons*", Petroleum Processing, 8, pp. 377-382 (1953).

Garifzyanova, G.G. et al., "*Pyrolysis of Vacuum Resid by the Plasma Chemical Method*," Chemistry and Technology of Fuels and Oils, vol. 42, No. 3, pp. 172-175 (2006).

Holmen, A. et al., "*Pyrolysis of natural gas: chemistry and process concepts*", Fuel Processing Technology, 42, Elsevier Science B.V., pp. 249-267 (1995).

Jennings, R.J.S., "*Organic Chemicals from Natural Gas-I*", Chemical & Process Engineering, 33, pp. 243-246 (1952).

Kinney, C.R. et al. "*On the Mechanism of Carbonization of Benzene, Acetylene and Diacetylene at 1200° C*", Proc. $4^{th}$ Carbon Conference, Pergamon Press, pp. 301-313 (1960).

Lee, S.Y. "*Sintering behavior and mechanical properties of injection-molded zirconia powder*", Ceramics International, Elsevier Ltd., vol. 30, Issue 4, pp. 579-584 (2004). Abstract retrieved from the Internet:< URL: http://www.sciencedirect.com/science> on May 1, 2008.

Moskovits, M. et al, "*Sintering of bimodal Y2O3-stabilized zirconia powder mixtures with a nanocrystalline component*", Nanostructured Materials, Elsevier Science Ltd., vol. 11, Issue 2, pp. 179-185 (1999). Retrieved from the Internet: <http://www.sciencedirect.com/science> on Jul. 23, 2008.

Nait-Ali, B. et al., "*Thermal conductivity of highly porous zirconia*" Journal of the European Ceramic Society, Elsevier Ltd., vol. 26, Issue 16, pp. 3567-3574 (2006). Retrieved from the Internet:<URL:http://www.sciencedirect.com/science> on May 1, 2008.

Ries, H.C., "*Acetylene*", Process Economics Program, Stanford Research Institute, Report No. 16, Menlo Park, CA, Sep. 1966, pp. 1-403.

China and the Japanese Petrochemical Industry, Chemical Economy and Engineering Review, Jul./Aug. 1985, vol. 17, No. 7.8 (No. 190), pp. 47-48.

Ovid'Ko, I.A. et al., "*Plastic Deformation and Fracture Processes in Metallic and Ceramic Nanomaterials with Bimodal Structures*", Rev. Adv. Mater. Sci. vol. 16 pp. 1-9 (2007).

Pertti Auerkari, Mechanical and Physical Properties of Engineering Alumina Ceramics, Technical Research Centre of Finland, 1996, pp. 1-26.

Sherwood, V.P.W. et al., "*Acetylene from Natural Gas and Petroleum*", Erdoel and Kohle 7, pp. 819-822 (1954).

Sneddon, R., "*Successful Acetylene Synthesis*", The Petroleum Engineer, 26, pp. C5-C8 (1954).

Weaver, T. "*Economics of Acetylene by Wulff Process*", Processing Engineering, Chemical Chemical Engineering Progress. 49, pp. 35-39 (1953).

Vaβen, R. et al., "*Toughening of sic ceramics by a bimodal grain size distribution produced by hiding ultrafine and coarse grained SiC powers*", Nanostructured Materials, Elsevier, vol. 6, No. 5, pp. 889-892(4) (1995). Retrieved from the Internet:<URL:http://www.ingentaconnect.com> on May 1, 2008.

\* cited by examiner

PYROLYSIS REACTOR MATERIALS AND METHODS

FIELD OF THE INVENTION

This invention pertains to advanced materials, methods, and apparatus useful in regenerative pyrolysis reactors such as may be used for pyrolyzing or cracking hydrocarbons. In one non-limiting example, the invention relates to advanced ceramic materials, apparatus, and methods suitable for use in cracking hydrocarbon feedstocks in a high-severity, regenerative pyrolysis reactor. More particularly, the invention relates to coking and carbide corrosion resistant pyrolysis reactor apparatus.

BACKGROUND OF THE INVENTION

Economical operation of high severity hydrocarbon cracking processes and equipment requires overcoming numerous competing operational and engineering challenges. The high temperatures and process stresses can exceed the long term viability of most conventional apparatus, including conventional refractory ceramics. In addition to component physical and thermal performance considerations, component chemical inertness and crystalline stability also become significant considerations. Degradation and corrosion present extra obstacles requiring address, particularly in temperature hydrocarbon processing.

One problem pertains to ceramic stabilizer volatility and progressive loss of such stabilizer from a ceramic matrix due to the severe temperatures and cyclic temperature swings. Related issues include carbon infiltration and coking within the ceramic matrix pores and an associated, undesirable carbide-oxide interaction chemistry resulting in progressive corrosion and degradation of the ceramic matrix. Such problems are of particular interest in high severity pyrolysis of hydrocarbon feedstocks (e.g., >1500° C.).

Conventional steam crackers are a common tool for cracking volatile hydrocarbons, such as ethane, propane, naphtha, and gas oil. Other higher severity thermal or pyrolysis reactors are also useful for cracking hydrocarbons and/or executing thermal processes, including some processes conducted at temperatures higher than can suitably be performed in conventional steam crackers. Compared to conventional cracking equipment and processes, higher temperature reactions and processes typically require more complex, costly, and specialized equipment to tolerate the intense heat and physical stress conditions. Properties such as temperature, reaction environment, component strength, and toughness limitations commonly define upper limits for many processes.

In addition to processes utilizing high temperatures (e.g., >1500° C.) posing equipment challenges, processes involving high temperature plus large cyclic temperature swings and directional changes of cyclic process fluid, such as in regenerative or reverse flow reactor processes, pose even greater challenges. For example, the art discloses that to efficiently obtain relatively high yields of acetylene from pyrolyzing methane feed, such as in excess of 75 wt. % yield, reactor temperatures in excess of 1500° C. are required and preferably in excess of 1600° C., with relatively short contact times (generally <0.1 seconds). Due to the high temperatures involved, such processes are generally limited to relatively small amounts or batches using cyclical processes yielding a mixture of acetylene, CO, and $H_2$. Due to the high severity, such methane cracking processes, however, have been relatively inefficient, impractical, and of very limited commercial value as compared to other more economical processes for generation of acetylene. Acetylene is typically generated commercially by cracking feeds other than methane at lower temperatures.

The high temperature processes (e.g., >1500° C.) have previously not scaled well and are generally only useful for relatively high-cost, specialty applications. Processes such as thermally cracking methane to acetylene have been commercially unattractive due in large part to thermal, chemical, and mechanical degradation of the reactor equipment, including ceramic material used therein. Cyclic temperature changes and product flow direction changes impose severe physical strength and toughness demands upon the refractory materials at high temperature. Such stresses and performance demands have also typically limited manufacturing and use of the refractory materials to relatively simple shapes and components, such as bricks, tiles, spheres, and similar simple monoliths. Reactor component functions and shapes for all refractory materials suffer limited use in high severity services.

In addition to physical temperature limitations for reactor materials, many prior art ceramic reactor materials that are relatively inert at lower temperatures become susceptible to chemical degradation, ceramic corrosion, and/or crystalline alteration at higher temperatures, leading to premature degradation and/or process interference such as by generation of unacceptable levels of contaminants in the process. Although high temperature regenerative pyrolysis reactors are generally known in the art as capable of converting or cracking hydrocarbons, they have not achieved widespread commercial use, due significantly to the fact that they have not been successfully scaled to a commercially economical size or useful life span as compared to less severe alternatives, such as steam cracking.

The identified prior art pertaining to refractory materials for high-severity hydrocarbon pyrolysis dates primarily to the 1960's and earlier. However, that art merely occasionally provides generalized lists of some exemplary materials such as ceramics, alumina, silicon carbide, and zircon as reactor materials. These sparse, non-specific disclosures left the art largely incapable of providing a large-scale, commercially useful reactor or reactor process. The teachings of the art were only effective for enabling relatively small scale specialty applications that see vastly inferior use as compared to large scale processes such as hydrocarbon steam cracking. The identified art is void of teaching or providing a refractory ceramic material capable of sustaining the complex set of properties that are required for extended use in the reactive or other most-demanding regions of a high-severity ($\geq 1500°$ C.) pyrolysis reactor, such as for the commercial production of acetylene and/or olefins from methane or other hydrocarbon feed. The studied art does not teach preferred crystalline structure or composition for particular reactor furnace uses, or for complex reactor component shapes and/or functions. Multimodal ceramics are also known in the ceramics art, as are ceramic compositions utilizing nanoparticles. However, the art remains void of teaching a ceramic or other composition or method of preparing the same that meets the rigorous performance properties needed for commercial application and long-term stability in high temperature cyclic pyrolysis processes. Further, the desired materials must maintain their formulations, crystalline structure, and corresponding physical and chemical properties for prolonged periods of time, at commercial scale and within the confines of an economic requirement. The studied art is believed similarly deficient at teaching such refractory materials, particularly those suitable for use as complex, irregular, relatively fragile, and/or functionally-shaped reactor components.

For further example, the "Wulff" process represents one of the more preferred commercial processes for generation of acetylene. Wulff discloses a cyclic, regenerative furnace, preferably including stacks of Hasche tiles (see U.S. Pat. No. 2,319,679) as the heat exchange medium. However, such materials have demonstrated insufficient strength, toughness, and/or chemical inertness, and are not amenable to use as certain desirable reactor components, such as for use as reactor fluid conduits, to facilitate large-scale commercialization. Although some of the "Wulff" art disclose use of various refractory materials, a commercially useful process for methane cracking or other extreme high-temperature processes has not previously been achieved utilizing such materials. The aforementioned practical obstacles have impeded large scale implementation of the technologies. Materials availability for high temperature, high-stress applications is one of the most critical issues in design and operation of large-scale, commercial, high-productivity, thermal reactors. Due to high temperatures involved in cyclic pyrolysis reactors, generally only ceramic components have the potential to meet the materials characteristics needed in such aggressive applications.

One attempt to overcome the aforementioned problems involved use of a "deferred combustion" process that delayed combustion and heat generation until the reaction components were positioned into the core of the reactor, thermally isolated from flow control equipment that was subject to premature degradation. The deferred combustion, regenerative reactor process and equipment was disclosed in a U.S. patent application filed Dec. 21, 2006, Sr. No. 11/643,541, entitled "Methane Conversion to Higher Hydrocarbons," related primarily to methane feedstocks for pyrolysis systems. Although the disclosed process of the '541 application effectively controls the location of combustion within the reactor, the internal reactor components must still contend with the severely high temperatures, temperature changes, and physical stresses incurred during methane pyrolysis, particularly for a commercially desirable reactor life term. The refractory material comprising the reactive regions may typically be a ceramic or related refractory material. In some embodiments, however, the disclosed processes and material may utilize relatively complex shaped refractory components, such as a thin-walled honeycomb monolith used to conduct process fluids through the reactor. Such reactors and reactor component geometries demand materials that have strength, toughness, chemical inertness, and other required properties that exceed the capabilities of previously identified or known refractory materials under such temperature and stress conditions.

While many ceramics tend to be somewhat inert or chemically stable at moderately elevated temperatures, many ceramics become chemically and/or structurally unstable at severely elevated temperatures, tending to degrade and corrode within undesirably short periods of time, rendering them unsuitable for some applications. Exemplary chemically and/or thermally unstable ceramics include certain silicas, aluminas, borides, carbides, and nitrides. Many of such ceramics are also known to undergo alterations in crystalline structure at elevated temperatures and/or across relevant process temperature ranges. Such alterations can result in changes in bulk volume which result in creation of stress fractures and/or cleavage planes which in turn may reduce the material's strength or performance properties.

Zirconia is a crystalline material that is commonly used in certain refractory ceramics. However, zirconia undergoes a crystalline change between moderately high temperatures and severely high temperatures in the way its atoms are stacked (polymorphic transformation). Zirconia has a monoclinic crystal structure between room temperature and about 1200° C. Above about 1200° C., zirconia converts to a tetragonal crystal structure. At a still higher temperature, such as above 2370° C., zirconia changes from tetragonal to cubic structure and melts at 2715° C. These transformations are accompanied by volumetric shrinkage and expansion between the crystalline states, resulting in fractures or cleavages along grain boundaries. In polycrystalline zirconia, this tetragonal-monoclinic transition and cleaving results in a progressing reduction in strength and potential catastrophic failure of the component. Stabilizers, such as yttria ($Y_2O_3$) and some metal oxides can be incorporated within the crystal structure to arrest or prevent the crystalline shifts, rending the crystal structure more stable across a broader temperature spectrum.

A related problem has to do with stabilizer loss during high temperature (at least 1500° C.) hydrocarbon pyrolysis. It has recently been learned that extended exposure of stabilized ceramic components, such as but not limited to stabilized zirconias, to high temperature processes and severe environments can result in progressive evacuation or loss of the stabilizer component from the ceramic crystals. This loss undesirably results in gradual temperature-related re-alteration of the crystal structure over time, further leading to onset of the aforementioned cleaving and fracturing problems. Such stabilizer material loss and crystal alteration result in a corresponding ceramic degradation and reduction in life expectancy of the component, due to compromised performance properties.

For many applications, it has been learned that certain stabilizers are more volatile and susceptible to progressive high temperature loss than other stabilizers. Consequently, the more volatile stabilizers are frequently less desirable than the more loss-resistant stabilizers. For example, it has been learned that calcia (CaO) and magnesia (MgO) stabilizers are capable of providing a stabilized ceramic that initially achieves many of the desirable performance properties, but over time calcia and magnesia stabilizers may be more susceptible to loss than other less volatile stabilizers.

Still another problem particular to hydrocarbon pyrolysis pertains to carbon infiltration and coking within the porosity of the ceramic component, which at high temperature can produce a carbide-oxide conversion chemistry on the zirconia oxide that also leads to progressive component degradation, herein considered a type of "ceramic corrosion." This newly recognized corrosion mechanism was not previously identified, understood, or recognized as a concern with high temperature hydrocarbon pyrolysis using ceramics.

The pyrolysis art needs a stabilized ceramic composition that provides the desirable set of performance properties and that can sustain those properties for a commercially meaningful period of use, by resisting loss of stabilizer, maintaining crystalline stability, and enduring prolonged exposure to high severity temperatures, substantial temperature swing cycles, cyclic flows of combustion and reaction materials. The desired materials must also resist the carbide-oxide corrosion problems. Still further, the desired materials must concurrently provide and maintain the needed structural integrity, crystalline stability, relatively high heat transfer capability, and chemical inertness required for large scale, commercial, high productivity applications, particularly those pertaining to hydrocarbon pyrolysis. Unavailability of such materials, components, and associated processes has been one of the most critical impediments to large scale, commercial adoption and application of many high temperature pyrolysis and chemistry processes and apparatus.

SUMMARY OF THE INVENTION

The present invention relates to thermal pyrolysis of hydrocarbon feedstocks and in one aspect includes inventive materials for useful in pyrolyzing hydrocarbon feedstock in a pyrolysis reactor, preferably in some embodiments a regenerative pyrolysis reactor, and in still other embodiments a reverse flow type regenerative reactor. The inventive apparatus are resistant to carbon deposition, carbide-oxide interactions, and associated ceramic corrosion and component degradation. In another aspect, the invention provides a stabilized zirconia refractory ceramic that is resistant to loss of stabilizer and resistant to shifts in crystalline structure across a broad temperature range. The disclosed stabilized zirconia ceramic resists carbide-oxide interaction corrosion, thereby resisting progressive performance degradation due to ceramic corrosion. In one embodiment, the invention includes a carbide-oxide corrosion resistant regenerative pyrolysis reactor apparatus useful for pyrolyzing a hydrocarbon feedstock at temperatures of at least 1500° C.

The invention includes a refractory material comprising yttria stabilized zirconia and comprising at least 21 wt. % yttria based upon the total weight of the refractory material. In other embodiments, the refractory material may consist essentially of zirconia and yttria, notwithstanding the minor presence of other additives such as manufacturing and processing additives. In many applications, the inventive material may be suitable for use in a pyrolysis reactor used for pyrolyzing a hydrocarbon feedstock. In many embodiments, the refractory material also has porosity of from 5 to 28 vol. % based upon the volume of the material.

In some aspects of the invention, the refractory material comprises a monomodal or normal grain size distribution, while in other embodiments, the refractory material comprises at least a first grain mode including yttria stabilized zirconia and a second grain mode comprising yttria. In other embodiments, the refractory material comprises; (i) at least 20 wt. % of a first grain mode, the first grain mode comprising stabilized zirconia having a D50 grain size in the range of from 5 to 800 μm based upon the total weight of the refractory material, the first grain mode comprising at least 6 wt. % yttria based upon the weight of the first grain mode; and (ii) at least 1 wt. % of second grain mode having a D50 grain size in the range of from 0.01 μm up to not greater than one-fourth the D50 grain size of the first grain mode stabilized zirconia, based upon the total weight of the refractory material, the second grain mode comprising at least 14 wt. % yttria based upon the weight of the second grain mode.

In some embodiments the invention includes a ceramic corrosion resistant regenerative pyrolysis reactor system comprising: a first reactor and a second reactor in flow communication with the first reactor, at least one of the first reactor and the second reactor comprising a refractory material comprising an yttria stabilized zirconia, the refractory material comprising at least 21 wt. %, preferably at least 25 wt. %, and sometimes even more preferably at least 30 wt %, yttria based upon the total weight of the refractory material. In many embodiments, the refractory material has porosity at 20° C. in the range of from 5 to 28 vol. % based upon the volume of the refractory material. In some embodiments, the reactor system may include yttria stabilized zirconia grains having a D50 grain size in the range of from 0.01 μm up to 2000 μm, while in other embodiments, the reactor system may include yttria stabilized zirconia grain sizes having a D50 grain size of from 5 μm to 800 μm.

In still other embodiments, the invention includes a method for mitigating carbide corrosion while pyrolyzing a hydrocarbon feedstock at high temperature using a pyrolysis reactor system comprising the steps of: (a) providing a pyrolysis reactor system comprising stabilized zirconia in a heated region of the reactor, the stabilized zirconia including at least 21 wt. % yttria and having porosity of from 5 vol. % to 28 vol. %; (b) heating the heated region to a temperature of at least 1500° C.; and (c) pyrolyzing a hydrocarbon feedstock within the heated region. One exemplary but non-limiting method of heating the reactive region utilizes the step of heating the reactive region by deferred combustion.

In another exemplary but non-limiting aspect, the invention includes a method for pyrolyzing a hydrocarbon feedstock at high temperature that mitigates carbide corrosion, including the steps of (i) flowing at least one reactant in a first direction through the reactor system; (ii) reacting the at least one reactant within the reactor system to heat the yttria stabilized zirconia within the reactive region; and (iii) flowing a hydrocarbon feedstock through the heated region to crack at least a portion of the hydrocarbon feedstock and produce a cracked hydrocarbon feedstock.

DETAILED DESCRIPTION

Figure 1A:
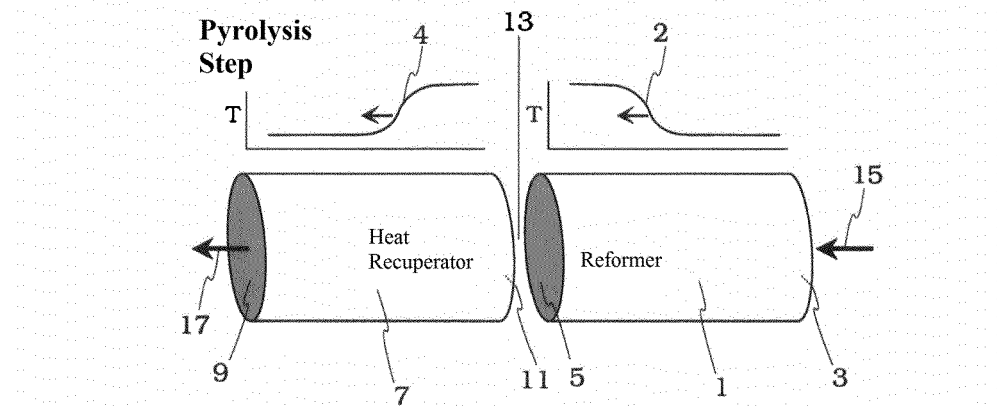
FIGS. 1(a) and 1(b) are a simplified, diagrammatic illustration of the two primary process steps in a regenerating reverse flow pyrolysis reactor system, according to exemplary applications of the present invention.

The present invention relates to advanced refractory type ceramics and uses for the same. In various aspects, the invention includes materials, components, apparatus, and processes having particular application for use with pyrolysis reactors and processes for performing high temperature (e.g., >1500° C.) chemistry, conversions, cracking, and/or thermal alteration of feeds such as but not limited to hydrocarbon feeds. The inventive aspects include but are not limited to ceramic components and apparatus using the same that have improved high temperature stability, prolonged component life expectancy, and/or sustained performance properties that may exceed the life expectancy of one or more of such properties as compared to previously known ceramics. The term "pyrolysis" as used herein may be defined to include substantially any use of heat or thermal energy, whether produced or used directly, such as by flame-fired furnace, or indirectly such as by exothermic reactions, combustion, or heat transfer from a heated media, to cause the molecular conversion, reaction, reforming, degrading, or cracking of a hydrocarbon feedstock into an intermediate or product stream, and may optionally include supplementation by one or more other processes, such as but not limited to catalysis, hydrogenation, esterification, oxidation, reduction, etc., and optionally with diluents, solvents, etc., and/or stripping agents.

The present invention provides yttria ($Y_2O_3$) stabilized zirconia ($ZrO_2$) ceramic compositions that are resistive to stabilizer loss, avoid ceramic corrosion problems, maintain crystalline stability, and can endure prolonged exposure to high temperatures, substantial temperature swing cycles, and stress cycles due to cyclic flow of feedstocks and reaction materials. The inventive aspects may have particular utility that facilitates enhanced large-scale commercialization of high temperature pyrolysis conversion processes. Exemplary suitable processes may include but are not limited to high-temperature pyrolysis reactor conversion of methane or other hydrocarbon feed to acetylene or olefins, coal gasification processes, syn-gas processes, steam crackers, etc. Exemplary apparatus may include but are not limited to pyrolysis reactors, reverse flow reactors, regenerative reactors, deferred combustion reactors, gasification reactors, syngas reactors, and steam cracking reactors and furnaces. Other exemplary inventive components may include but are not limited to reactor components and apparatus that feature engineered or otherwise particularly designed shapes, functions, configurations, intricacies, or irregular geometries that benefit from improved mechanical strength and thermal shock resistance at high temperatures (e.g., >1500° C.). Such improvements may also lead to improved processes related thereto.

In one aspect, the present invention provides a stabilized ceramic composition that is particularly resistive to progressive loss of stabilizer, carbon permeation, and carbide-oxide ceramic corrosion, thereby preserving the crystalline structural under exposure to high temperature and/or highly reactive environments. Exemplary properties benefiting from the preserved stabilization may include certain performance properties such as but not limited to flexural strength or modulus of rupture (MOR), normalized thermal shock resistance, and chemical stability at high temperature, as compared to such collective properties of previous art. Such improvements may facilitate large scale commercialization of processes and apparatus that were previously technically and/or economically disadvantaged due to unacceptable component life.

The inventive materials include a stabilized zirconia ceramic material, stabilized primarily by yttria (includes $Y_2O_3$ and/or an yttrium-containing compound), although other stabilizing compounds or elements may also be present in concentrations that are secondary to the yttria concentration. Yttria is present in an amount of at least 21 wt. % and in many embodiments at least 25 wt. %, and in many other embodiments at least 30 wt % yttria, based upon the total weight of the stabilized zirconia composition present. In many embodiments, at least a portion of the zirconia is fully stabilized and in other embodiments substantially all of the zirconia present is fully stabilized. In still other embodiments, portions or all of the zirconia may be partially stabilized, while still other embodiments may include a mixture of fully and partially stabilized zirconias. Generally, fully stabilized zirconia may be preferred in order to avoid detrimental risk of progressive loss of stabilizer and progressive carbide-oxide ceramic corrosion.

According to various zirconia-yttria phase diagrams, about 14 wt. % (precisely 13.3 wt. % i.e. 8 mol. %) of yttria is required to fully stabilize a zirconia crystal structure. Fully stabilized zirconias have previously only been commercially available with yttria concentrations of up to about 14 wt. % or only slightly above 14 wt. %, such as at most up to about 18 wt. % (~10 mol. %) yttria. About 14 wt. % (~8 mol percent) of yttria mixed into zirconia composition provides a substantially fully stabilized, cubic crystalline structure that is phase-stable over the relevant temperature range, such as from 650° C. up to 2260° C., for the period of time that such concentration of the yttria stabilizer remains within the composition.

To achieve the desired function of avoiding the detrimental effects of progressive loss of stabilizer and progressive carbide-oxide ceramic corrosion, the stabilized ceramic compositions according to this invention utilize zirconia as the base metal or ceramic component and stabilize the zirconia with yttria. The inventive material also includes at least 21 wt. % of yttria and in many embodiments at least 25 wt. % yttria, and in still other embodiments, at least 30 wt. % yttria, based upon the total weight of the zirconia-yttria composition. In high temperature hydrocarbon pyrolysis use, the fully stabilizing 14 wt. % amount of yttria does not alone achieve the objective of preventing ceramic corrosion for an acceptable length or duration of commercial use. An incremental amount of at yttria is needed to achieve such objective.

Surprisingly, it has recently been learned that the yttria stabilizer concentration in excess of the amount required to at least partially stabilize the zirconia (e.g., that amount in excess of about 6 wt. %) or even to fully stabilize (e.g., the amount in excess of 14 wt. %) serves not only as a preservative component, serving to inhibit or compensate for high temperature progressive loss of stabilizer, but may also at concentrations of at least 21 wt. % is required to provide sufficient ceramic corrosion resistance to the crystal structure. With regard to yttria stabilizer, 21 wt. % has been determined through experimentation as the minimum concentration required to prevent or adequately compensate for carbide-oxide ceramic corrosion, based upon the total weight of the zirconia composition or material. Amounts of yttria present in excess of 21 wt. % not only preserve the thermal stability of the zirconia crystal structure but also to prevent progressive ceramic corrosion.

At stabilizer concentrations of less than about 21 wt. % and particularly at concentrations of less than 18 wt. %, and even more noticeably at less than 14 wt. %, the newly recognized phenomenon of carbide-oxide ceramic corrosion that occurs during high temperature (>1500° C.) pyrolysis of hydrocarbon feeds is found to be a significant problem. It has also been learned that even with fully yttria stabilized zirconia with excess yttria at total yttria amounts in excess of 14 wt. % but less than 21 wt. %, an unacceptable level of carbide-oxide ceramic corrosion still occurs.

The newly identified process of so-called carbide-oxide corrosion describes effects observed during transition of zirconia compound from an oxide to a carbide and then back to an oxide with undesirable precipitation of carbon and undesirable changes in morphological and crystal structure. At high temperatures (e.g., >1500° C.), zirconium oxide ($ZrO_2$) is reduced to zirconium carbide (ZrC) when in contact with solid carbon or in carbon-containing gases, through zirconium oxycarbide $Zr(C_xO_y)$ as an intermediate phase. When ZrC is exposed to moderately high temperatures (>500° C.) in an oxidizing atmosphere that contains oxygen-containing gases, ZrC converts back to $ZrO_2$ through $Zr(C_xO_y)$ as an intermediate phase. The atomic oxygen displaces carbon in the interstitial vacancies of the ZrC crystal lattice, forming the intermediate, $Zr(C_xO_y)$. Continuing oxidation of $Zr(C_xO_y)$ leads to carbon precipitation at the $ZrC/ZrO_2$ interface. Such retention of carbon with the oxidation of ZrC triggers further deposition and buildup of carbon from the process stream, further exacerbating the cyclic oxide-carbide-oxide transition problem and increasing porosity. The altered crystal structure suffers degradation in mechanical strength and thermal shock resistance.

In the reverse-flow reactor conditions, materials are subjected to myriads of cycles of oxidizing/carburizing gases. Under these conditions, zirconia has been observed to gradually change its morphological appearance leading to "raspberry-like" grain morphology. The raspberry-like grain structure is an observable sign of carbide-oxide ceramic corrosion and can be determined by scanning electron microscopic (SEM) examination of the tested material. The raspberry-like grain structure is believed caused by the cyclic transitions and leads to increased surface area, which in turn leads to still further build-up of carbon, which in turn leads to still further cyclic corrosion transitions. Once the corrosion initiates, the process can accelerate until the effect causes an unacceptable level of material degradation.

Unlike $ZrO_2$, yttria ($Y_2O_3$) is stable in the presence of carbon-containing gases and does not form yttria carbide (YC). Yttrium carbide (YC) is only formed from metallic yttrium (Y), not from $Y_2O_3$. Since $Y_2O_3$ is relatively inert to solid carbon or carbon-containing gases as compared to zirconia, so the $Y_2O_3$ addition to a $ZrO_2$ crystal lattice above the critical concentration appears to suppress detrimental transition from carbide to oxide. Surprisingly, it has been learned that at sufficient level of yttria, the carbide-oxide corrosion mechanism can be inhibited or prevented. This minimum threshold concentration of yttria is determined to be 21 wt. %, based upon the total weight of the ceramic material. The mechanism by which the yttria works is still not wholly understood and is subject to some speculation and uncertainty, but the inventive methods and material formulations have been determined successful at inhibiting the carbide-oxide corrosion mechanism.

The function of providing ceramic corrosion resistance is distinct from the function of merely providing a stabilizer preservative resource. Providing a stabilizer preservative component or resource can be accomplished with merely a fully stabilized zirconia and such stabilizer concentration can offset the progressive volatile loss of stabilizer that occurs due to exposure to high temperatures and/or chemically active environments. However, the function of preventing detrimental occurrence of carbide-oxide ceramic corrosion requires substantially greater concentration of excess stabilizer. Concentrations of yttria in excess of 14 wt. % and more particularly yttria concentrations in excess of 21 wt. %, and preferably in excess of 25 wt. % or even 30 wt. % are not only structurally distinct but are more importantly functionally distinct from embodiments having lesser amounts of yttria (e.g., less than 14 wt. %). Yttria concentrations of about 14 wt. % or slightly less in a stabilized zirconia is generally only sufficient to function as a preservative component, but is insufficient to prevent carbide-oxide corrosion. The yttria stabilizer concentration of at least 21 wt. % and amount in excess thereof are sufficient to enhance the stabilizer activity level to a level that mitigates, retards, prevents, and/or compensates for the adverse effects of high temperature carbide-oxide corrosive activity within the stabilized zirconia ceramic.

It was unexpectedly found, however, that having at least 21 wt. % (~12 mol %) concentration of yttria stabilizer and preferably at least 25 wt. % (~15 mol %) and sometimes even at least 30 wt. % (~18 mol %) yttria stabilizer substantially prevents the detrimental occurrence of such ceramic corrosion. On the other hand, concentrations of yttria of at least 14 wt. % and up to 21 wt. %, however, have been determined sufficient to function as a stabilizer preservative component and offset the progressive high temperature loss of stabilizer so as to stabilize the crystal structure. However, yttria concentrations within a range of from 14 wt. % up to almost 21 wt. % are often inadequate to prevent the progressive occurrence of carbide-oxide interaction activity resulting in ceramic corrosion.

High concentrations of calcia (CaO), magnesia (MgO), and/or ceria ($CeO_2$) stabilizers might also offer some limited resistance against such corrosion. However, it has also been learned that for many high temperature hydrocarbon pyrolysis applications, calcia and magnesia stabilizers are more volatile than yttria and are therefore potentially of less value as either a preservative component or as a ceramic corrosion preventative agent than yttria, although the presence of such other stabilizers materials within the zirconia composition is not precluded, either with or without the corresponding presence of yttria. In one aspect, the inventive components and materials comprise yttria stabilized zirconia based ceramics. Preferably, the zirconia material includes a diversity of grain sizes, such as, for example, in a multimodal grain configuration, so as to facilitate some density increase via grain packing. The excess yttria (that portion in excess of 6 wt. % or in excess of 14 wt. %, up to the at least 21 wt. % or higher concentration) also may fully stabilize any partially stabilized zirconia during sintering and/or annealing.

The stabilized zirconia material containing yttria stabilizer concentration of at least 21 wt. %, preferably at least 25 wt. % and more preferably at least 30 wt. % may be comprised of a cubic zirconia solid solution, tetragonal zirconia solid solution, monoclinic zirconia solid solution, cubic yttria solid solution, $Y_4Zr_3O_{12}$ (δ-phase), hexagonal $Y_6ZrO_{11}$ phase and a mixture of thereof that are listed in the zirconia-yttria phase diagram. As long as the phase contains yttria at least 21 wt. %, preferably at least 25 wt. % and more preferably at least 30 wt. %, the phase prevents the detrimental occurrence of carbide-oxide ceramic corrosion.

Preferably, during sintering, the excess yttria stabilizer positions primarily at the grain boundaries and grain surfaces. The excess yttria stabilizer-rich surface layer provides a higher thermodynamic activity level of stabilizer than the interior of the first grain mode and thereby suppresses the progressive migration or loss of stabilizer from within the interior of the first grain mode. The stabilizer-rich surface layer on the particles, preferably primarily on the more coarse particles, provides crystal stability and resistance against ceramic carbide-oxide corrosion over extended duration of use.

In some embodiments, the yttria stabilized zirconia ceramic may further comprise one or more "secondary oxides" selected from the group consisting of Al, Si, Mg, Ca, Y, Fe, Mn, Ni, Co, Cr, Ti, Hf, V, Nb, Ta, Mo, W, Sc, La, and Ce, and mixtures thereof. The secondary oxides may be merely incidentally present, such as via contamination or as a result of the sintering, annealing, or other manufacturing process. The secondary oxides may also be purposefully added, such as to improve certain properties or uses, e.g., such as processability during manufacture; or may be generated and deposited as a bi-product from the thermal process and other materials present. The amount of secondary oxides in the stabilized zirconia formed component may typically range from virtually none present up to 10 wt. %, or from 0.001 wt. % present up to 10 wt. %, or in some embodiments from 0.01 wt. % to 5 wt. %, or typically in still other embodiments from 0.1 to 3 wt. %, based on the weight of the formed stabilized zirconia component.

As much of the discussion herein pertains to sizes and concentrations of components and materials after sintering, the terms "grain" and "particle" are used interchangeably herein. The "grains" that are formed and are observable after sintering, are derived from a mixture of particles (some of which might also include several grains, however) that are mixed and combined prior to sintering. Grain size or particle size, refers to the effective diameter or geometric size of individual grains of the matrix comprising a multimodal grain distribution. A grain or particle is the individually definable substantially homogenous units of zirconia or yttria or other granular material that forms the entirety of the ceramic material or component. The grains or particles are sintered and bonded together at grain boundaries to create a formed ceramic component. Dynamic light scattering and laser light diffraction analysis using a unified scatter technique (Microtrac® 3500) can be used to determine average particle size and particle size distribution. Microtrac® instruments can measure particle size ranging from 0.024 to 2800 μm and provide good instrument-to-instrument agreement, sample-to-sample agreement, instrument internal repeatability and particle distribution breadth.

The "D50" or average particle size measured by a laser light diffraction method is one type of average particle size represented as D50 or mean diameter. The D50 average particle size is a value determined by using a particle size distribution measuring device and represents a particle sample cut diameter which is the 50% volume or weight fraction value after determining the minimum and maximum sizes contributing to the integrated volume of a specific peak of a particle size distribution. Similarly D90, D10, D99 respectively corresponds to the 90, 10 and 99% volume or weight fractions of the particle size distribution. The average (D50) or any other particle size cut value can be determined by microscopy methods such as optical microscopy (OM), scanning electron microscopy (SEM) and transmission electron microscopy (TEM). The average particle size values measured by microscopy methods also can be converted to D50 values by methods known in the field. The particle size distribution of the first grains alternatively can be determined by a sieve and mesh classification method as known in the art.

The particles can be substantially any shape. In many embodiments, a preferred shape may be those particle shapes that are substantially spherical or more spherical in dimensions than nonspherical. Some non-limiting acceptable examples include spherical, ellipsoidal, polyhedral, distorted spherical, distorted ellipsoidal, distorted polyhedral shaped, angular, rectangular, tetrahedral, quadrilateral, elongated, etc. The shape of smaller grain particles may generally be of less importance than the shape of relatively larger particles. Spherical grains may be particularly beneficial in providing close packing, density, optimum porosity, and flowability during powder processing and fabrication. A preferred spherical shape of the first grain can be characterized by an aspect ratio less of than 2.5, or preferably less than 2.0, or more preferably less than 1.5. Grains with generally smoother surfaces may also be preferred as compared to grains having highly irregular surface shapes.

Spherical shape refers to a symmetrical geometrical object where the set of all points in three dimensional space ($R^3$) which are at the distance R from a fixed point of that space, where R is a positive real number called the radius of the sphere. The aspect ratio of a shape is the ratio of its longest axis to its shortest axis. The aspect ratio of symmetrical objects may also be described by the ratio of two measures (e.g. length and diameter). The aspect ratio can be measured by microscopy methods such as optical microscopy (OM), scanning electron microscopy (SEM), and transmission electron microscopy (TEM), in combination with image analysis software, wherein a two-dimensional shape is projected.

In some embodiments, the inventive material, components, and reactor systems may include yttria stabilized zirconia grains having a D50 grain size in the range of from 0.01 μm up to 2000 μm, while in other embodiments, the reactor system may include yttria stabilized zirconia grain sizes having a D50 grain size in the range of from 0.01 μm to 800 μm, in other embodiments, from 5 μm to 800 μm. The inventive composition might also include other grain sizes, many of which will have a minimum grain size of at least 0.01 μm, or at least 0.125 μm, or at least 0.2 μm, or at least 1 μm, or at least 2 μm, or at least 5μm, or at least 10 μm. An upper limit for the other grain sizes present may include grain sizes of up to 400 μm, or up to 200 μm, or up to 100 μm, or up to 50 μm, or up to 40 μm, or up to 20 μm, or up to 10 μm, or up to 5 μm, or up to 2 μm, or up to 1 μm. The aforementioned list of grain sizes is merely exemplary and not exhaustive. Other similar ranges of grain sizes are useful for the inventive composition. The size preference may be determined by the particular component being prepared and its intended use, temperature ranges, and stress conditions. For example, dimensionally larger, heftier components can utilize grain sizes within the broader ranges, including the larger ranges, while more intricate or delicate components such as thin-walled honeycomb monoliths or other relatively delicate or high stress component might particularly benefit from the relatively smaller grain size ranges.

As stated previously, in addition to a minimum yttria concentration being useful at controlling ceramic corrosion, it has recently been learned that porosity can also play a significant role in controlling ceramic corrosion. Porosity facilitates small scale matrix flexibility among the matrix particles while also permitting dissipation of both mechanical and thermal stress concentrations (particularly with respect to arresting crack propagation). Although porosity plays a significant role with respect to the high strength and thermal shock resistance of the inventive ceramic materials, a downside to the porosity is that too much porosity can permit coking and infiltration of carbon within the ceramic structure, which in turn leads to ceramic corrosion. Surprisingly, it has been learned that a balance must be struck between too much porosity and too little. The inventive material or compositions have a minimum porosity value, such as at least 5 vol. %, or in some various embodiments, at least 8 vol. %, or at least 10 vol. %, or at least 15 vol. %, or at least 20 vol. %, or sometimes at least 25 vol. %. More importantly however from the standpoint of preventing ceramic corrosion problems, the inventive material or compositions have a maximum porosity value, such as up to 10 vol. %, or up to 15 vol. %, or up to 20 vol. %, or up to 25 vol. %, or perhaps in some embodiments even up to 28 vol. %, based upon the bulk volume of the inventive material. The porosity range of 5 to 28 vol. % as used herein is defined for the limited purpose of preventing carbide-oxide ceramic corrosion, with the desired, more specific narrower porosity range defined after consideration of other performance properties such as but not limited to strength and thermal shock resistance. If ceramic corrosion is not of significant concern then broader porosity ranges might be useful in some embodiments.

The prescribed porosity feature is attributed with providing improved thermal stress crack resistance by inhibiting crack formation and arresting crack propagation, and simultaneously facilitating some elastic deformation of the matrix structure, thereby providing enhanced service life in the stressful, high temperature, cyclic thermal applications. Porosity also provides high surface area for improved heat absorption and dissipation, as compared to typically less-porous, high-density, high-strength ceramics such as common refractory and engineering grade ceramics. Some of the other various functions of the porosity include but are not limited to increased surface area for hear transfer, increased thermal shock resistance, mitigation of crack propagation, improved flexural strength, etc. Selecting the most appropriate porosity range depends upon consideration and balancing of these and other various performance objectives, including controlling ceramic corrosion, to ascertain the most desirable porosity for a particular material or component. The porosity of the ceramic matrix of the formed ceramic component is measured at ambient temperature, such as at 20° C., after sintering the green body for at least ten minutes at 1500° C. Preferably, the desired porosity range is retained after prolonged exposure to the operation temperature and after annealing or at operational temperatures above 1500° C., such as up to 1800° C. or even up to 2000° C. Porosity is generally located among the closely packed grains is preferably substantially uniformly dispersed throughout the composition.

It has recently been learned that limiting the maximum porosity to such values tends to effectively, if not actually limit interconnectivity of the pore spaces with other pore spaces to an extent that inhibits migration of elemental carbon or carbon compounds within the inventive material or components (e.g., limited effective permeability to carbon and carbon compounds). This limited permeability helps mitigate or limit carbon penetration among the pores and matrix of the inventive material during high temperature pyrolysis of hydrocarbon feedstocks, thereby mitigating or limiting the potential for carbide-oxide ceramic corrosion. Carbon may still penetrate the surface pores and perhaps some near-surface pores of the inventive material or components during hydrocarbon pyrolysis, but the limited porosity will constrict carbon from permeating deeper or dissipating throughout the entirety of the material or component, due to lack of effective permeability to carbon or carbon compounds. It has been determined that the maximum 28 vol. % and preferably 25 vol. %, and sometimes even more preferable 20 vol. % porosity limits, effectively obviate undesirable effects of carbide-oxide corrosion within the inner structure of the inventive zirconia material or component. Thereby, such material or component may experience extended operational performance as compared to such components having high porosity values. The optimal or acceptable porosity ranges for the inventive material or component depends upon the desired final component performance properties, but is within a range defined by one or more of the above minimum porosity values and one or more of the maximum porosity values, or any set of values not expressly enumerated between the minimums and maximums (e.g., between 5 vol. % and 28 vol. %).

Therefore, in addition to achieving a desired set of physical performance properties, a key objectives of the present invention includes, but is not limited to, controlling component degradation caused by carbide-oxide ceramic corrosion. In summary, surprisingly, it has been learned that prevention or mitigation of such corrosion can be accomplished not only by providing at least 21 wt. % yttria in a zirconia ceramic composition, but also by limiting the maximum porosity value to not greater than 28 vol. %, and more preferably not greater than 25 vol. % porosity within the inventive material or component. Many preferred embodiments will incorporate both at least 21 wt. % yttria and porosity within a range of from 5 vol. % up to not greater than 28 vol. %. When limited porosity is combined with the prescribed minimum of 21 wt. % yttria, detrimental internal effects of carbide-oxide corrosion are virtually eliminated or severely curtailed. Only the progressive occurrence of other modes of failure, such as progressive crack propagation might permit permeation of carbon within the material or component's inner structure, and even then the 21+ wt. % concentration of yttria can further control or delay harmful onset of ceramic corrosion.

In addition to the desirability of controlling ceramic corrosion by the presence of at least 21 wt. % of yttria and preferably not more than 28 vol. % limit on porosity, the overall performance characteristics of the inventive ceramic material may also be attributable at least in part to one or more of various other inventive material characteristics such as but not limited to, the particle size and arrangement, or in some embodiments the multimodal particle sizes and distribution, material selection, degree of stabilization, manufacturing methods and techniques used, actual porosity, and combinations thereof. However, the combination of the porosity and the substantial yttria concentration uniquely preserves an otherwise improved combination of MOR flexural strength, thermal shock resistance, and component life expectancy that was not previously known in the industry. The virtues and functions of these other performance parameters and features have been described in previous patent applications, including U.S. patent application filed Dec. 21, 2006, Ser. No. 11/643,541, entitled "Methane Conversion to Higher Hydrocarbons," related primarily to methane feedstocks for pyrolysis systems the entirety of each are incorporated herein by reference to the extent not inconsistent with this invention.

All embodiments of the present invention comprise an aggregate of at least 21 wt. % yttria, based upon the total weight of the stabilized zirconia composition. The yttria may be in the form of a stabilizer in a zirconia grain composition, as particles or grains that are distinct from the stabilized zirconia particles, or both. The size(s) of the yttria particles may also be similar to a size range or mode of at least some of the zirconia particles and/or the yttria particles may be of a size that is distinct from the zirconia particles, or both. Particularly with the excess portion of yttria (that amount of yttria in excess of the amount of yttria that is directly involved with stabilizing the zirconia crystal structure) the size of the yttria particles should be considered when preparing a zirconia composition according to the present invention, but is generally open to selection of the desired particle size. For example, the yttria particles may be generally coarse such as a coarse mode or set of zirconia grains, or generally within the size range of the smaller zirconia particles present, and/or of a size that is completely different from the size of most of the zirconia particles. For further example, small, more delicate or critical components may elect to select yttria particles that are generally smaller with respect to the zirconia particles, but other larger or more geometrically substantial embodiments may benefit from having some yttria particles that are on par size-wise with the larger zirconia particles. In still other embodiments, the yttria may be a mixture of larger yttria particles and smaller yttria particles. The mechanism of providing or combining the yttria within the zirconia is not constrained, as the yttria may be provided such as in the form or particles or grains, or by solution deposition, precipitation, grinding and mixing, or by any other suitable method of preparing or forming the material prior to sintering. The yttria is preferably substantially evenly distributed throughout the zirconia. The yttria serves both to stabilize the zirconia crystal structure across the broad spectrum of the relevant temperature range, as well as simultaneously contributing to the core physical and performance properties of the ceramic.

In addition to improved density, the close grain packing also facilitates enhanced post-sintering strength among the closely packed coarse grits as compared to sintering of only a narrow grain size embodiment having less dense packing. The limitations on ratio of second grit mode grain size versus size of the first or coarse grit mode particles provide a range of formed ceramic component properties that may be preferred for use in certain components or reactors useful for commercial scale applications for performing high temperature thermal or pyrolysis processes. Second grit mode particles fit within the interspatial gaps, adjacent the tangent point between coarse grits and provide close packing and corresponding high packing density. Second grits at or near the tangent between coarse grits may also enhance bonding after sintering the multimodal mix. The resulting adherent bonding between coarse grits is also at least partly responsible for the corresponding high density and improved flexural strength of the ceramic composition. A desired porosity value with the above range may be application-defined and may be facilitated during manufacture or preparation of the formed ceramic composition such as by controlling certain manufacturing or preparation properties, such as but not limited to grain size selections and ratios of amount of coarse versus second grains, mixing energy and methods, extrusion or pressing forces applied to the component during formation, sintering temperature and time, etc. For example, preparation of the formed ceramic component prior to sintering may utilize a lower extrusion pressure or compaction pressure than is traditionally utilized in manufacture of engineering grade or even some refractory grade ceramics, whereby grain compaction is controlled to avoid over-compaction. Preparation method may be adjusted as needed to yield a formed ceramic component or reactor that includes the desired porosity.

The superior thermal shock resistance, relative chemical inertness, preserved crystalline structure, improved flexural strength, and high temperature capability of the inventive compositions, components, and reactors of the present invention provide crystalline stability and structurally soundness under cyclical thermal conditions at temperatures of 1500° C. and higher, such as up to 1700° C., 1800° C., or in some embodiments, up to 2000° C., particularly as compared to prior art refractory and thermal components and reactors. Such attributes and properties may facilitate components and reactors that can replace conventional refractories and also facilitate use of processes in relatively large scale commercial applications that were previously not economical or technically achievable. In particular, the heat stable, formed ceramic components, reactors, and processes may find particular application in refining, petrochemical, chemical processing, and other high temperature thermal applications. It is believed that the improved combination of properties provided according to the present disclosure may facilitate commercial service periods of greater than 1 year, for example even up to about 10 years in some applications.

The particles or grains can be either single crystalline or polycrystalline. Polycrystalline grains are made of many smaller crystallites with varying orientation. Various types of grains can be utilized which include but are not limited to agglomerated and sintered, fused and crushed, and spherodized. In one form, the grains are agglomerated and sintered powder which is produced by spray drying of a suspension consisting of fine powders and organic binder and subsequent sintering. In another form, the grains are fused and crushed, which is produced by fusing in arc furnaces and crushing of the cold block. In still another form of the disclosure, the first grains are spherodized, such as by atomization of agglomerates using a plasma flames to fabricate substantially spherical shaped particles.

In one form, the inventive material and components may be prepared by manufacturing techniques such as but not limited to conventional ceramic powder manufacturing and processing techniques, e.g., mixing, milling, pressing or extruding, sintering and cooling, employing as starting materials a suitable ceramic powder and a binder powder in the required volume ratio. Certain process steps may be controlled or adjusted to obtain the desired porosity range and performance properties, such as by inclusion of various manufacturing, property adjusting, and processing additives and agents as are generally known in the art. For example, the two or more modes of powders, oxides, preservatives, and/or stabilizers may be milled in a ball mill in the presence of an organic liquid such as ethanol or heptane for a time sufficient to substantially disperse the powders in each other. Excessive binder powder and liquids may be removed and the milled powder dried, placed in a die or form, pressed, extruded, formed, caste or otherwise formed into a desired shape. The resulting "green body" is then sintered at temperatures of at least 1500° C. and commonly up to about 1800° C. for at least ten minutes, and often for times typically ranging from about 10 minutes to about two hours and in some applications even up to 4 hours. The sintering operation may be performed in an oxidizing atmosphere, reducing atmosphere, or inert atmosphere, and at ambient pressure or under vacuum. For example, the oxidizing atmosphere could be air or oxygen, the inert atmosphere could be argon, and a reducing atmosphere could be hydrogen. The sintering atmosphere, temperature, and kiln environment may also introduce secondary oxides (as discussed previously herein) into the component, either desirably or undesirably, as a contaminant or desired/permitted constituent of the ceramic component. Thereafter, the sintered body is allowed to cool, typically to ambient conditions. The cooling rate may also be controlled to provide a desired set of crystal sizes and performance properties in the particular component.

In some embodiments, the present invention includes ceramic compositions having a single mode or "monomodal" grain size distribution, or an essentially non-modally-defined broad grain size distribution, or a substantially single grain size distribution, or combinations thereof In other embodiments, the present invention includes ceramic compositions having a multimodal (e.g., bimodal, trimodal, etc.) grain distribution, and/or an embodiments lacking in modal definition. However, for purposes of preparing ceramic zirconia materials, compositions, and apparatus that are resistive to oxide-carbide ceramic corrosion, the particular grain structure is less relevant consideration than is the type of stabilizer (e.g., yttria), the minimum concentration thereof, and preferably also the controlled porosity range.

Many embodiments of the present invention are substantially monomodal zirconia, yttria stabilized compositions. However, in some embodiments, the invention includes ceramic compositions having at least a two-component stabilized zirconia grain size distribution ("multimodal" or having at least two modes), such as but not limited to a multimodal (e.g., bimodal, trimodal, etc.) grain distribution. For example, in various embodiments there may be multiple modes of zirconia, and/or multiple modes of yttria, and/or a first mode of zirconia and second mode of yttria, and/or multiple modes of zirconia, multiple modes of yttria, etc. Some multiple mode embodiments have demonstrated uniquely pertinent strength and thermal shock resistance properties.

The term "multimodal" is not intended to limit the invention or grain distribution only to a type of distribution curve exhibiting two or more distinct humps or peaks, although such is often within scope. The inventive grain distribution also includes a substantially single hump or single peak curve covering a size distribution. In many embodiments, however, the inventive grain distribution may include a recognizable first distribution of grains and a second distribution of grains, the first distribution by convention defined as the coarser or relatively larger sized mode than the second distribution. A multiple-mode grain distribution may facilitate increased grain packing density and commensurate MOR strength, within the prescribed range of particle sizes, while still facilitating the presence of the beneficial porosity component of the material also within a prescribed range. In still other embodiments, the present invention includes ceramic compositions having a narrow range of grain sizes, wide range or grain sizes, and/or a mixture or random distribution of grain sizes. The present invention is not limited to multimodal grain distributions, and includes substantially any yttria stabilized zirconia grain size distribution, preferably those that also exhibit various desirable performance properties, such as but not limited to strength, thermal shock resistance, porosity, etc. For example, in other embodiments, the invention includes ceramic compositions having a substantially monomodal grain size distribution More particularly, in some embodiments, the advantageous physical performance properties and/or characteristics of the material (e.g., flexural strength and thermal shock resistance) are realized in part from close packing of the ceramic grains. For example, in a multimodal embodiments, one mode of a bimodal grain distribution may include a D50 first grain particle size in the range of from 5 to 2000 µm, or from 5 to 800 µm; and the second grain mode of grain distribution, including the preservative component, includes a D50 particle size in the range of from at least about 0.01 µm to not larger than one-fourth (¼) of the D50 grain size of the first grain. The second grains are substantially evenly disbursed within the first grains. In other exemplary embodiments, the second grains may include a D50 size value that ranges from 0.01 to 100 µm. In other embodiments, for example, the second mode grains may include a D50 size value that ranges from 0.05 to 44 µm, while in still other embodiments the second mode grains include a D50 size value that ranges from 0.05 to 5 µm. For example, in one embodiment, the first grain mode may include a D50 size that ranges from 20 to 200 µm, while the corresponding second grain mode may range from 0.05 to 5.0 µm. In still other embodiments, the second grain mode may include a D50 average size diameter not greater than one-eight the D50 size of the corresponding first grain mode. In some embodiments the D50 size of the fine mode grains may not exceed one tenth the D50 size of the first mode grains (e.g., not larger than one order of magnitude smaller than the first grain mode), while in other embodiments the D50 size of the second grain mode will generally be less than about two orders of magnitude smaller than the D50 size of the first grain mode (e.g., the second grains are sometimes not larger than about 100 times smaller than the D50 diameter of the first grains.) For still other various exemplary embodiments the D50 lower limit of the second grain stabilized zirconia may be 0.01 or 0.05 or 0.5 or 1 or 5 µm in diameter. A practical D50 lower limit on the second grain stabilized zirconia grains for many embodiments may be about 0.1 µm. Grains smaller than 0.1 µm may tend to be of limited usefulness in many applications due to the fact that such small grains may not distribute evenly and tend to melt together and combine into sintered grains that are of about the same size as do grains that are at least 0.1 µm. The stabilized zirconia and stabilizer grains that are of at least about 0.1 µm in diameter typically do not change size during or after sintering, whereas the nanoparticles may tend to combine into larger particles. For at least these reasons, the second grain mode of many embodiments of the subject invention might not include nanoparticle D50 size grit, unless such mode is purposefully introduced into and mixed with the coarse and second grain modes as a third or other mode, or as a secondary oxide. Commonly, nanoparticle modes of zirconia or stabilizer may generally only be considered as the second grain mode of the multimode structure when such grains are of sufficient presence to combine with each other to provide a second grain mode after sintering that provides mode grains of at least 0.01 µm after sintering and more preferably at least 0.1 µm after sintering. The D50 upper limit of the second grain mode, including the preservative component particles, may be 500 or 100 or 44 or 20 or 15 or 10 or 5 or 1 µm in diameter. The D50 lower limit of the first grain stabilized zirconia may be 5 or 20 or 25 or 30 or 40 or 100 µm in diameter. The D50 upper limit of the first grain stabilized zirconia may be 800 or 500 or 200 or 100 or 50 µm in diameter. The lower size limitation however, for the second grain mode, including the limitation for the preservative component particles therein, is consistent with size limitations for the other particle size limitations and ranges pertaining to the second grain mode and is a D50 diameter of at least 0.01 µm, and sometimes preferably at least 0.1 µm. The "first" and "second" grain sizes referenced above are merely exemplary with respect to a bi-modal embodiment. As discussed previously, numerous mode types and non-modally defined grain distributions are also within the scope of the present invention. In these other mode or grain distribution types, suitable grain distribution sizes are within substantially any of the listed grain size ranges discussed with respect to the exemplary "first" and "second" grain embodiments.

A non-limiting example of a multimodal (bimodal) grain distribution may include from 1 to 20 wt. % of second grain particles and 80 to 99 wt. % of first grain particles. Another non-limiting example is a grain distribution that includes from 1 to 50 wt. % of second grain particles and 50 to 99 wt. % of first grain particles. Yet another non-limiting example is a grain distribution that includes from 1 to 80 wt. % of second grain particles and 20 to 99 wt. % of first grain particles Still another suitable, non-limiting example of a bimodal grain distribution includes 20 to 30 wt. % of first grains, such as but not limited to a D50 particle size of 30 µm, and 70 to 80 wt. % of second grains, such as but not limited to a D50 particle size of 0.3 µm. Another suitable, non-limiting example of a bimodal grain distribution includes 30 to 40 wt. % of first grains, such as but not limited to a D50 particle size of 30 µm, and 60 to 70 wt. % of second grains, such as but not limited to a D50 particle size of 0.3 µm. Another suitable, non-limiting example of a bimodal grain distribution includes 50 to 70 wt. % of first grains, such as but not limited to a D50 particle size of 30 µm, and 30 to 50 wt. % of second grains, such as but not limited to a D50 particle size of 0.3 µm. Another suitable, non-limiting example of a bimodal grain distribution includes 85 to 99 wt. % of first grains, such as but not limited to a D50 particle size of 30 µm, and 1 to 15 wt. % of second grains, such as but not limited to a D50 particle size of 0.3 µm. Yet another suitable, non-limiting example of a bimodal grain distribution includes 94 to 99 wt. % of first grains, such as but not limited to a D50 particle size of 30 µm, and 1 to 6 wt. % of second grains, such as but not limited to a D50 particle size of 0.3 µm.

Two key materials properties are identified as having significant importance with regard to the high-severity performance of ceramics in pyrolysis reactors and their corresponding suitability for application in large scale thermal processes; namely, thermal shock resistance and mechanical flexural strength (modulus of rupture, "MOR"). Other properties, such as but not limited to crystalline/chemical stability at high temperature and toughness are also important and must be considered when selecting an appropriate ceramic materials or components for an application. Retention or maintenance of these key and other properties over the useful life of the ceramic component is typically desirable. With regard to maintaining longevity of such properties in components, one of the most important factors is the crystalline / chemical stability at high temperatures. The suitably fabricated component must retain its thermal shock resistance and mechanical flexural strength over a suitable life span by not prematurely degrading or undergoing crystalline alteration, such as due to loss of stabilizer and/or due to carbide-oxide corrosion. The instant inventions incorporate particular features that function to maintain or preserve the crystalline stability, thermal shock resistance, and mechanical flexural strength, and possibly other related properties, for extended periods of time as compared to the useful duration of one or more of such properties in materials lacking the inventive preservative and/or ceramic corrosion resistance features.

Regarding the two above-referenced key performance properties, (thermal shock resistance and mechanical flexural strength), thermal shock resistance of a ceramic component can be defined as the maximum change in temperature that the material can withstand without failure or excessive damage. Thermal shock resistance is an evaluated parameter but not a material property. Description of thermal shock resistance may depend upon the type of thermal cycle, component geometry, and strength as well as on material properties or factors. Simplified mathematical expressions relying upon a variety of assumptions can be used to describe material performance under a set of conditions. Alternatively, much more complex analyses may be performed using numerical analysis methods such as finite element and stress-strain analysis. However, for materials performance comparison purposes a qualitative or direct comparative analysis is also useful and more practical. Thermal shock resistance may be evaluated by means of rapid water quench experiments such as illustrated in ASTM C1525. Thermal shock damage results in a material from buildup of thermal and physical stresses, usually during rapid heating or rapid cooling.

For example, the ASTM C1525 thermal shock resistance test method builds on the experimental principle of rapid quenching of a test specimen (e.g., 1"×1"×1/8" square, or 2.54 cm×2.54 cm×0.32 cm square) from an elevated temperature (e.g., 1100° C.) into a water bath at room temperature. After water quenching, the specimen is dried and dye-penetrated to investigate both open and closed cracks. For instance, Zyglo® water washable dye penetrants may be used. As the zirconia samples are typically white or yellow, pink dye provides a vivid depiction of cracks and helps differentiate cracks from background or grain boundaries. Methods for determining the cumulative or total crack length per unit area in each specimen are known in the art and may be determined by scanning software electronically aggregating the lengths of all cracks, backed up with visual confirmation by the technician. The electronic scanner resolution or magnification is generally not critical, e.g., from as low as from 50× to as high as 1000×. The tester need only be able to differentiate actual cracks from mere grain boundaries. As with any specified parameter, the value determined must be made over a sufficiently large region to provide a statistically sound representation of the entire sample. The total crack length per unit area may be determined over such area by aggregating and averaging a number of smaller regions that collectively represent a statistically sound region. A whole component may be studied or one or more regions may be evaluated. The studied or relevant region(s) or the whole component may be considered a "component" for test purposes herein.

Utilizing propensity of cracks observed in a test specimen, the thermal shock resistance for a particular region or component may be normalized and qualitatively scored, such as from 1 (the least resistance) to 5 (the most resistance) as summarized hereunder:

1: Open cracks and many closed cracks.
 2: Many closed cracks.
 3: Some closed cracks.
 4: Little closed cracks.
 5: No cracks.

Figure 2:
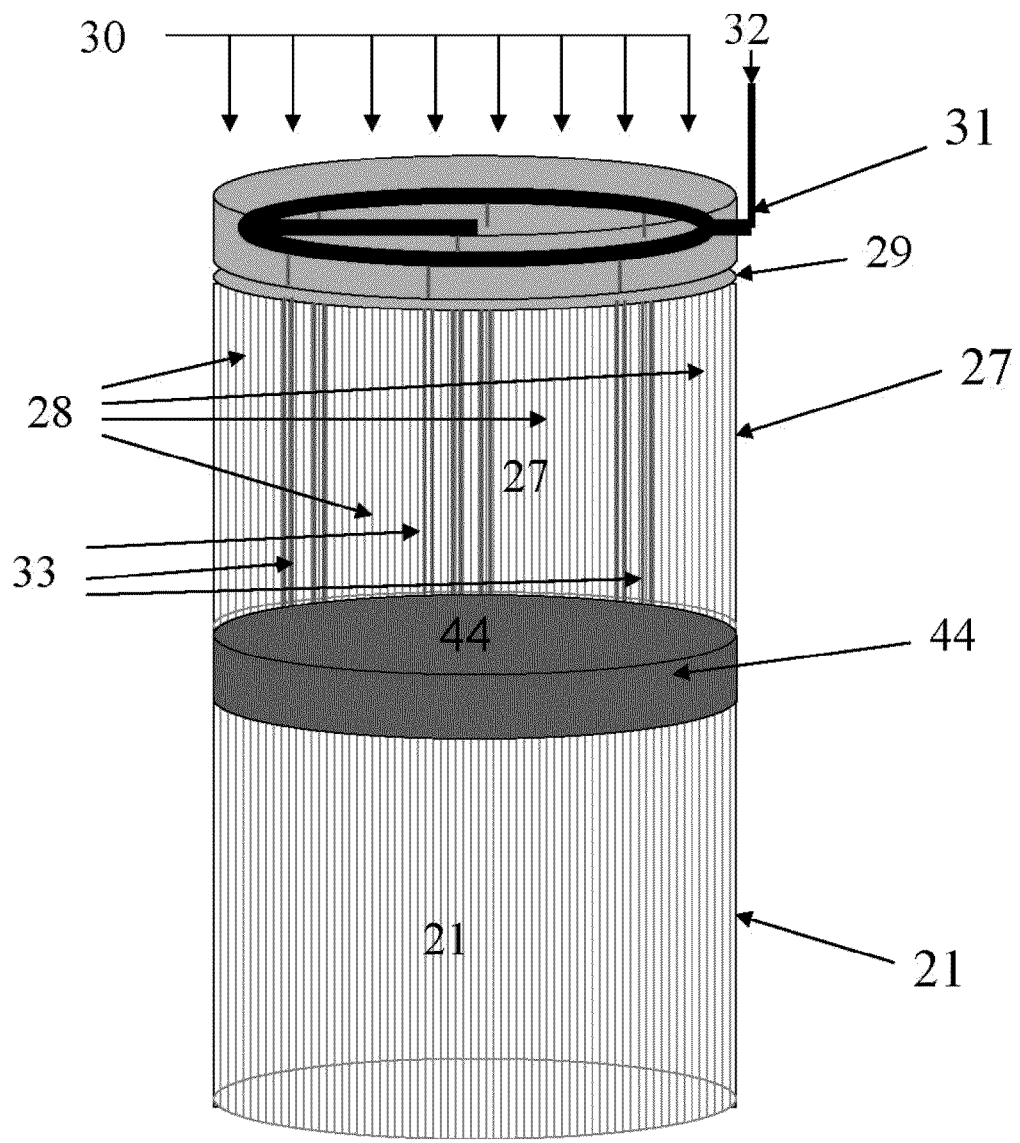
FIG. 2 is another simplified process flow diagram generally illustrating an embodiment of an application of the invention.
Figure 3:
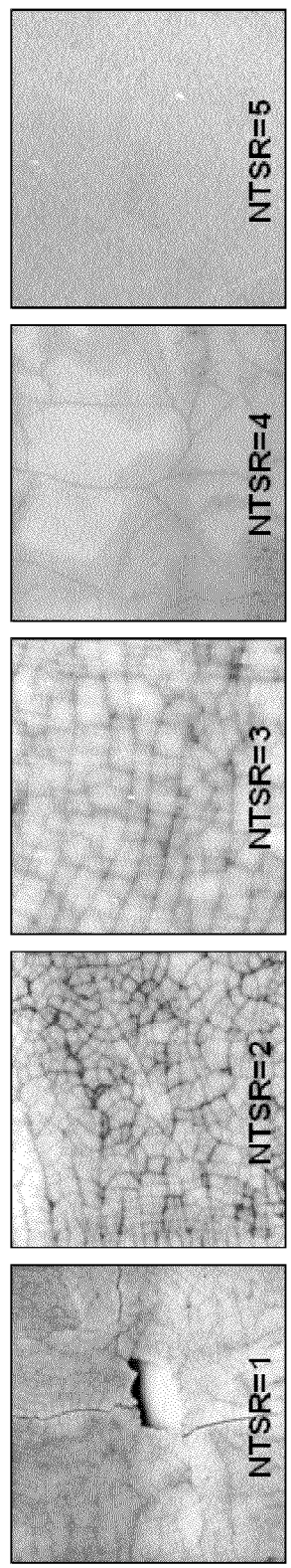
FIG. 3 provides photographic examples of stress cracking of various ceramic samples graded from 1 to 5 as further described herein to illustrate corresponding normalized thermal shock resistance.

The appearance of various degrees of cracking in rapidly quenched zirconia specimens or components and their corresponding qualitative, normalized thermal shock resistance (NTSR) value from 1 to 5 are illustrated in FIG. 2. A rating of 1 is least acceptable while a rating of 5 is most acceptable. The herein disclosed inventive compositions will typically produce a normalized NTSR rating of 3, 4, and 5. To quantify propensity of cracks observed in a thermal shock resistance test specimen, dye penetrated samples were optically scanned and subjected to an image analysis computer software program. For example, a total crack length per unit area of the test specimen may be measured by use of commercially available image analysis software, e.g., Clemex Vision PE, as reported in Table 1, and corresponding generally with the illustrative images of FIG. 2. (Other image analysis software applications are also available to similarly measure the total crack length of the specimen.)

TABLE 1

Illustrative examples of normalized thermal shock resistance (NTSR) index or rating, ranked from 1 to 5.

| NTSR Index | Measured total crack length per unit area (cm/cm$^2$) | Criteria of total crack length (cm/cm$^2$) |
| --- | --- | --- |
| 1 | 81.2 | >50 |
| 2 | 25.6 | >20-≦50 |
| 3 | 16.5 | >5-≦20 |
| 4 | 3.5 | >1-≦5 |
| 5 | 0.01 | ≦1 |

The stabilized refractory grade zirconia of this invention preferably demonstrates a total crack length per unit area after quenching a test specimen of the inventive material from 1100° C. into a water bath at room temperature that is not greater than 5 cm/cm$^2$; that is, it preferably has a NTSR of at least 4. Still more preferably, the stabilized refractory grade zirconia of this invention demonstrates a total crack length per unit area after quenching a test specimen of the stabilized refractory grade zirconia at 1100° C. into a water bath at room temperature that is more preferably not greater than 1 cm/cm$^2$; that is, more preferably has a NTSR of 5. However, for less demanding applications, the inventive components may demonstrate crack lengths in excess of 5 cm/cm$^2$, but preferably not greater than 20 cm/cm$^2$, thus having a corresponding NTSR of 3 or higher. The intended application determines the range of acceptable crack length. Thus, materials according to the present invention include those having a thermal shock resistance rating of 4 or 5, as described herein.

As set forth in ASTM C 1525-04, thermal shock resistance can be assessed by measuring the reduction in flexural strength (MOR) produced by rapid quenching of test specimens heated across a range of temperatures. For purposes of the stabilized zirconia of this invention, regarding quantitative measurement of thermal shock resistance, a critical temperature interval may be determined by a reduction in the mean flexural strength of a determined amount, such as for example, at least 30%. However, the test does not determine thermal stresses developed as a result of a steady state temperature differences within a ceramic body or of thermal expansion mismatch between joined bodies. Further, unless the test is repeated several times, the test is limited in its ability to quantitatively determine the resistance of a ceramic material to repeated or cyclic shocks. Thus, it is preferred that the test be repeated to analyze the effect of cyclic temperature shocks, such as may be experienced in a regenerative reactor.

Another key ceramic performance property with respect to the instant invention is flexural strength, which can be measured by 3-point bending tests as illustrated in ASTM F417. The test specimen, a small bar of square cross section, rests on two cylindrical supports in a compression test machine. It is bent by the application of force, at mid-span, to the opposite face of the bar from that resting on the two supports. The bending force is applied by a third cylinder (identical to the other two) at a prescribed constant rate until the specimen breaks. The breaking rod, the dimensions of the specimen, and the test span are used to calculate flexural strength.

As a ceramic material is heated, its density typically increases as a result of pore shrinkage due to the sintering effect caused by the heat. Sintering may result in some of the ceramic crystals or components therein melting or undergoing other high temperature fusion or shrinkage, resulting in a slight decrease in bulk volume, but with an increase in component strength. Thus, as a ceramic is heated, its MOR or mechanical flexural strength may typically also correspondingly increase slightly. However, when the hot ceramic is subjected to relatively quick cooling, such as via water quenching, stress fractures may be introduced thereby causing a weakening or reduction in the mechanical flexural strength. The combination of the multimodal grains and the porosity remaining after sintering results in a lattice type structure that provides the improved strength, heat stress dissipation and handling characteristics, and cyclic thermal stress resilience. The ceramic corrosion resistance features prevent degradation of these desirable properties, thereby extending component life.

The MOR and thermal shock property values refer to those property values determined after sintering, unless stated otherwise. ASTM 1505 describes the process for MOR determination. Limited duration exposure of the sintered component to annealing temperatures in excess of 1500° C., such as in excess of 1600° C. or at least 1800° C., may further refine the component properties as described herein. Such further thermal processing or annealing may generally further improve the strength and thermal shock resistance of the inventive components and reactors as compared to such properties after original sintering. After such "annealing" of the sintered component, such as at temperatures in excess of commercial use temperature, such as at an exemplary temperature of at least 1800° C. for two hours, the formed ceramic component according to this invention will demonstrates a retained porosity at ambient temperature in the range of from 5 to 45 vol. % based upon the formed volume of the component. Such components also demonstrate a flexural strength (MOR) of at least 6 kpsi, preferably at least 10 kpsi, and provide a thermal shock resistance rating of at least four (4), preferably at least five (5). The MOR flexural strength of the zirconia ceramic used for materials and reactor components according to this invention should be greater than or equal to about 6 kpsi (41.3 MPa) after initial sintering to at least 1500° C. and subsequent quenching to ambient temperature. Also, the MOR is preferably greater than or equal to about 6 kpsi (41.3 MPa) when the sintered component is further thermally conditioned, such as by reheating and quenching (e.g., annealed) to operating conditions. For example, the thermal conditioning may entail reheating the component to a temperature in a range such as from 1500° C. to 1800° C. or perhaps even up to 2000° C. Surprisingly, many of the inventive components routinely demonstrate a MOR of at least 6 kpsi (41.3 MPa) after further thermal processing. The combination of a normalized thermal shock resistance rating of 4, with such MOR strength is recognized herein as a minimal MOR and shock resistance properties that are necessary across the required broad reactor temperature spectrum to provide for long-term commercial utilization of high temperature pyrolysis chemistry processes, over a desired life cycle of the reactor component. The corrosion resistance component of this invention functions to prolong these properties of the component within that range of acceptability, correspondingly extending the useful life of the component and process. If desired, the effect of long duration MOR changes may also be evaluated to determine commercial suitability, such as the MOR after, say for example, one month of cyclic processing (annealing). The components and apparatus of the subject invention, however, are expected to provide life duration for the relevant components and apparatus beyond the level that was previously available in the art.

In one aspect, this invention includes a refractory material, such material having application in one aspect for use with a regenerative thermal pyrolysis reactor apparatus, such as for components useful for pyrolyzing a hydrocarbon feedstock (e.g., petroleum liquids, gas, or coal). In other aspects, this invention may be utilized for pyrolyzing or otherwise thermally processing various feedstocks other than hydrocarbon feeds at high temperature, such as but not limited to other high temperature chemical processes, reactions, such as but not limited to using various oxidizable, flammable, combustible, or otherwise thermally reactive materials, whether solid, liquid, or gas. Although the inventive materials are useful at high temperatures (>1500° C.), they may also be useful in various lower temperature applications. The term "hydrocarbon feedstock" as used herein is defined broadly to include virtually any hydrocarbonaceous feed and may also include substantially carbonaceous feeds such as graphite or coke. Exemplary hydrocarbon pyrolysis feedstocks that may have particular applicability for use in the present invention typically comprises but are not limited to one or more hydrocarbons such as methane, ethane, propane, butane, naphthas, gas oils, condensates, kerosene, heating oil, diesel, hydrocrackate, Fischer-Tropsch liquids, alcohols, distillate, aromatics, heavy gas oil, steam cracked gas oil and residues, crude oil, crude oil fractions, atmospheric pipestill bottoms, vacuum pipestill streams including bottoms, heavy non-virgin hydrocarbon streams from refineries, vacuum gas oils, low sulfur waxy residue, heavy waxes, coal, graphite, coke, tar, atmospheric residue, heavy residue hydrocarbon feeds, and combinations thereof. Undesirable fractions, solids and non-volatiles contained in the feedstreams may optionally be removed by one or more separation techniques, prior to feeding a volatizable fraction into the reactor. Diluents or other additives, such as but not limited to steam, water, methane, and hydrogen, may also be included within the feedstreams.

This invention includes but is not limited to use of components, apparatus, reactors, and methods disclosed in various, previous patent applications, the entirety of each of which are included herein by reference, including (i) U.S. application Ser. No. 60/753,961, filed Dec. 23, 2005, titled "Controlled Combustion for Regenerative Reactors;" (ii) U.S. application Ser. No. 11/639,691, filed Dec. 15, 2006, titled "Controlled Combustion for Regenerative Reactors;" (iii) U.S. application Ser. No. 11/643,541, filed Dec. 21, 2006, titled "Methane Conversion to Higher Hydrocarbons;" and (iv) U.S. patent application Ser. No. 12/119,762, filed May 13, 2008, titled "Pyrolysis Reactor Conversion of Hydrocarbon Feedstocks Into Higher Value Hydrocarbons." These patent applications teach and disclose various apparatus and methods for pyrolyzing hydrocarbon feeds in reverse flow regenerative pyrolysis reactors, including deferred combustion and controlled heat positioning processes. The inventions disclosed in this present invention may be suitable for use with but not limited to reactors as disclosed in these previous applications. The inventive components provide the strength, thermal shock resistance, and chemical stability required to enable commercialization of such apparatus and processes to operate at temperatures of at least 1500° C., and even in some embodiments in excess of 1600° C., in still other embodiments in excess of at least 1700° C., and in even other embodiments at temperatures in excess of 2000° C.

In some embodiments, the inventive components and reactors may comprise reverse flow regenerative pyrolysis reactor systems, including but not limited such systems that may utilize deferred combustion in a reverse flow reactor to heat the reactor core. In another aspect, the invention may enable use of various commercially useful high temperature materials, apparatus, and process such as but not limited to deferred combustion reactors, reverse flow pyrolysis reactors, regenerative pyrolysis reactors, and/or combinations thereof. For example, one type of useful reactor and components is a pyrolysis reactor that creates a high-temperature heat bubble in a reactor core or bed, such as by using a two-step process wherein heat is (1) added to the bed via in-situ combustion, and then (2) removed from the bed via in-situ endothermic reforming. A key benefit of such system is the ability to consistently manage and confine the high temperature bubble (e.g., $\geq$1500° C., preferably $\geq$1600° C., and sometimes even more preferably $\geq$1700° C.) in a reactor region(s) utilizing the inventive materials whereby the reactor components can tolerate such conditions for a commercially useful duration. The inventive materials, components, apparatus, and process enable large-scale, cyclic, high temperature, reactor systems that are useful and operable on a commercially desirable scale and life cycle.

The inventive materials and components may be provided, for example, in one or more pyrolysis reactors, such as but not limited to those reactors having regenerative reactor beds or cores that are useful for carrying out a high temperature chemical reaction. The inventive ceramic components also may be used in construction of one or more reactor embodiments, components, or regions of the reactor system, and may be of substantially any suitable geometry, form or shape, such as but not limited to spheres, beads, honeycomb materials, tubes, pipes, U-tubes, fluid mixers, nozzles, extruded monoliths, bricks, tiles, reactor trays, tray components, and other refractory components that are exposed to high temperature. Such components, as used in a reactor, may by design include flow channels, conduits, or other space which may be regarded or referred to as "void volume" through which fluid passes as part of the function of the component. It is understood that such void volume is not considered to be part of the "porosity" of the ceramic material as described herein. The ceramic porosity specified herein is specifically for the matrix or portion of the component that does not carry flow; often referred to as the wall or the solid portion of the component. Similarly, references to the volume of the material or component are referring to the ceramic matrix volume, including the porosity therein, and not to the primary fluid conducting channels or void volume. The sustained strength and relative inertness properties of the inventive materials may provide for a wider range of component geometries and function than previously available in the art, again also leading to process improvements.

In one aspect, the invention includes a refractory material suitable for use in a pyrolysis reactor for pyrolyzing a hydrocarbon feedstock, the refractory material comprising an yttria stabilized zirconia, the refractory material comprising at least 21 wt. % yttria, (in some embodiments preferably at least 25 wt. % yttria) based upon the total weight of refractory material. In many preferred embodiments, the refractory material also has porosity in the range of from 5 to 28 vol. %, in other embodiments from 5 to 20 vol. %, and in still other embodiments from 10 to 20 vol. %, based upon the volume of the refractory material.

In some embodiments, the inventive refractory material includes a monomodal grain distribution, or a random grain distribution. In other embodiments, the refractory material comprises at least a first grain mode (e.g., such as a coarse grain mode) including yttria stabilized zirconia and a second grain mode (e.g., such as a grain mode smaller in D50 size than the D50 size of the first grain mode) comprising yttria. The second grain mode may include the yttria in an yttria stabilized zirconia, or as yttrium oxide, or a combination of both. In one exemplary multimodal embodiment, the refractory material comprises at least 21 wt % of yttria based upon the total weight of such refractory material, the individual modes within the refractory material including; (i) at least 20 wt. % of a first grain mode based upon the total weight of the refractory material, the first grain mode comprising yttria stabilized zirconia having a D50 grain size in the range of from 5 to 2000 μm (some embodiments may have a D50 grain size in the range of from 5 to 800 μm), the first grain mode comprising at least 6 wt. % yttria (in some embodiments at least 14 wt. % yttria, in other embodiments at least 18 wt % yttria, or even at least 20 wt % yttria) based upon the weight of the first grain mode; and (ii) at least 1 wt. % of second grain mode having a D50 grain size in the range of from 0.01 μm up to not greater than one-fourth the D50 grain size of the first grain mode stabilized zirconia, based upon the total weight of the refractory material, the second grain mode comprising at least 14 wt. % yttria based upon the weight of the second grain mode. In some embodiments the second grain mode includes yttria stabilized zirconia, while in other embodiments the second grain mode consists essentially of yttria, while in still other embodiments, the second grain mode includes both yttria and yttria stabilized zirconia. In other aspects of the refractory material, the first grain mode comprises at least 50 wt. %, or at least 70 wt. % or at least 80 wt. %, of yttria fully stabilized zirconia comprising at least 14 wt. % yttria, based upon the weight of the first grain mode. In other embodiments, the second grain mode may comprise yttria fully stabilized zirconia and excess the yttria (e.g., that portion in excess of about 14 wt. %) is included within one or more of (a) the first grain mode, (b) the second grain mode, and (c) an optional another grain mode. Such excess may be present as stabilizer or as a distinct yttria composition. The yttrium component of some embodiments of the inventive refractory material may comprise at least one of yttria oxide, an yttrium containing compound, and combinations thereof.

In many preferred embodiments, the grains (yttrium and/or yttrium stabilized zirconia grains) comprising the refractory material may include yttria and/or yttria stabilized zirconia, at least one of (often preferably both of) the yttria and/or the yttria stabilized zirconia having a D50 grain size in the range of from 0.01 to 2000 μm.

The pyrolysis reactor may be substantially any pyrolysis reactor, such as but not limited to at least one of (a) a regenerative pyrolysis reactor, (b) a reverse flow regenerative pyrolysis reactor, (c) a reverse flow reactor, (d) a deferred combustion pyrolysis reactor, and (e) a combinations thereof The inventive refractory material may also include from 0.001 wt. % to 5 wt. % based upon the weight of the refractory material, of compounds that comprise elements selected from the group consisting of Al, Si, Mg, Ca, Fe, Mn, Ni, Co, Cr, Ti, Hf, V, Nb, Ta, Mo, W, Sc, La, and Ce, and mixtures thereof The inventive refractory material may be used in a pyrolysis reactor for pyrolyzing a hydrocarbon feedstock at a temperature of at least 1500, or at least 1600° C., or at least 1700° C. The refractory material may be used for any of a wide variety of refractory components, such as but not limited to, spheres, beads, honeycomb materials, a tube, a pipe, a U-tube, a fluid mixer, a nozzle, an extruded monolith, bricks, tiles, catalyst tray, reactor tray, tray component, valves, and/or other refractory components. This list is merely exemplary of some common components used with pyrolysis reactors, and such inventive materials may also be useful with other types of pyrolysis reactors, feeds, and processes.

In other aspects, the inventions include a ceramic-corrosion-resistant, pyrolysis reactor system comprising: a first reactor and a second reactor in flow communication with the first reactor, at least one of the first reactor and the second reactor including a refractory material comprising yttria stabilized zirconia, the refractory material comprising at least 21 wt. % yttria based upon the total weight of the refractory material. In many embodiments, the refractory material has porosity at 20° C. in the range of from 5 to 28 vol. % based upon the volume of the refractory material. Some embodiments may include generally a single mode range of grit sizes, or a mix of particle sizes that are generally not well defined into a mode or grit sizes. In other embodiments, the refractory material may be a multimodal grit composition, including at least a first grain mode including yttria stabilized zirconia and a second grain mode comprising yttria, the second grain mode either consisting essentially of yttria or as a component of an yttria stabilized zirconia, or as a mix of both. In some multimodal embodiments, the refractory material comprises; (i) at least 20 wt. % of a first grain mode, the first grain mode comprising yttria stabilized zirconia having a D50 grain size in the range of from 5 to 2000 µm, based upon the total weight of the refractory material, the first grain mode comprising at least 6 wt. % yttria based upon the weight of the first grain mode; and (ii) at least 1 wt. % of second grain mode having a D50 grain size in the range of from 0.01 µm up to not greater than one-fourth the D50 grain size of the first grain mode stabilized zirconia, based upon the total weight of the refractory material, the second grain mode comprising at least 14 wt. % yttria based upon the weight of the second grain mode. In other multimodal embodiments the first grain mode is substantially fully stabilized and comprises at least 14 wt. % yttria based upon the weight of the first grain mode.

In other embodiments, the reactor system may further comprise: (i) the first reactor further comprises a first channel for conveying a first reactant through the first reactor and a second channel for conveying a second reactant through the first reactor, the first reactant exothermically reacting with the second reactant to generate heat; (ii) the second reactor is heated by the heat to a temperature of at least 1500° C. for pyrolyzing a hydrocarbon feedstock in the second reactor, wherein the second reactor comprises the refractory material comprising yttria stabilized zirconia comprising at least 21 wt. % yttria based upon the total weight of the stabilized zirconia and porosity of from 5 vol. % to 28 vol. % based upon the volume of the refractory material.

In many embodiments, the reactor system comprises a regenerative reactor system. In other embodiments, the reactor system comprises a reverse flow regenerative reactor system.

Still other embodiments of the reactor system may include a reactant mixer positioned intermediate the first reactor and the second reactor to combine at least a portion of the first reactant with at least a portion of the second reactant, the reactant mixer comprising the reactor material.

Some embodiments of the reactor material includes yttria and/or yttria stabilized zirconia, at least one of the yttria and/or the yttria stabilized zirconia having a D50 grain size in the range of from 0.01 µm to 2000 µm. In still other embodiments, the yttria stabilized zirconia comprises yttria and/or zirconia grains having a D50 grain size in the range of from 5 to 800 µm.

In other aspects, the invention includes a method for mitigating carbide-oxide ceramic corrosion while pyrolyzing a hydrocarbon feedstock at high temperature using a pyrolysis reactor system, the method comprising the steps of: (a) providing a pyrolysis reactor system comprising yttria stabilized zirconia reactor material in a heated region of the reactor, the yttria stabilized zirconia reactor material including at least 21 wt. % yttria; (b) heating the heated region to a temperature of at least 1500° C.; and (c) pyrolyzing a hydrocarbon feedstock within the heated region. In many embodiments, the yttria stabilized zirconia reactor material has porosity of from 5 vol. % to 28 vol. %. The heated region is defined broadly to include substantially any component or region of or within a pyrolysis reactor system that is exposed to high temperature. In many embodiments, the yttria stabilized zirconia reactor material including at least 21 wt. % yttria and has porosity of from 5 vol. % to 28 vol. %, or sometimes preferably from 5 vol. % to 25 vol. %. In other embodiments, the reactor material includes at least 22 wt. % yttria, or at least 25 wt. % yttria, or at least 30 wt. % yttria.

In many embodiments, the method further comprises the step of heating the heated region by combustion and in some embodiments heating by deferred combustion.

In other embodiments the method also includes the steps of: (i) flowing at least one reactant in a first direction through the reactor system; (ii) reacting the at least one reactant within the reactor system to heat the yttria stabilized zirconia within the heated region; and (iii) flowing a hydrocarbon feedstock through the heated region to crack at least a portion of the hydrocarbon feedstock and produce a cracked hydrocarbon feedstock. In many embodiments, such method may also include the step of quenching the cracked hydrocarbon feedstock by contacting the cracked hydrocarbon feedstock with an yttria stabilized zirconia within the reactor at a temperature lower than a pyrolysis temperature of the heated region. In still other embodiments, the method includes the step of decoking the reactor by flowing at least one of steam, air, water, hydrogen, oxygen, and combinations thereof into the reactor.

According to many embodiments, the method also includes the step of (a) providing a pyrolysis reactor system including yttria stabilized zirconia reactor material in a heated region of the reactor, the yttria stabilized zirconia reactor material includes at least 21 wt. % yttria (some embodiments preferably include porosity of from 5 vol. % to 28 vol. %, and a stabilized zirconia including; (i) at least 20 wt. % of a first grain mode based upon the total weight of the reactor material, the first grain mode comprising yttria stabilized zirconia having a D50 grain size in the range of from 5 to 2000 µm, the first grain mode comprising at least 6 wt. % yttria based upon the weight of the first grain mode; and (ii) at least 1 wt. % of second grain mode having a D50 grain size in the range of from 0.01 µm up to not greater than one-fourth the D50 grain size of the first grain mode stabilized zirconia, based upon the total weight of the reactor material, the second grain mode comprising at least 14 wt. % yttria based upon the weight of the second grain mode. In still other embodiments, the first grain mode is fully stabilized and comprises at least 14 wt. % yttria based upon the weight of the first grain mode. In still yet other embodiments, the first grain mode yttria stabilized zirconia has a D50 grain size in the range of from 5 µm to 800 µm.

In some embodiments, the method is conducted using a reactor material, whereby at least 80 wt. % of the reactor material has a D50 grain size in the range of from 0.01 to 2000 µm. In other embodiments, the first grain mode yttria stabilized zirconia has a D50 grain size in the range of from 5 µm to 800 µm.

In one aspect, the invention includes a ceramic refractory material, such as may be useful in a pyrolysis reactor for use in pyrolyzing a carbon-containing feedstock, such as a hydrocarbon feedstock. In many embodiments, the reactor will be a regenerative reactor, in other embodiments a reverse flow type of regenerative reactor. A regenerative reactor is substantially any reactor which is cyclically heated and then reduced in temperature, and then reheated to repeat the process. Direction of flow through the reactor is not critical. A reverse flow regenerative reactor is a pyrolysis reactor or reactor system, whereby fluids flow therein for a period of time in one direction through all or selected portions of the reactor and react or are otherwise processed therein. The direction of flow is then reversed and other materials are fed from the opposite direction through the reactor to displace any remaining first materials or reaction products back in the direction opposite from the original flow. The cycle is then repeated. Thereby, the reactor bed or reactor media components are exposed to materials flowing in each direction through the reactor. For example, heat may be produced or added to the reactor by reactants flowing in one direction and that heat may be used to pyrolyze or otherwise facilitate product-generating reactions in the reactor. A substantial part of the heat is then removed during product flow, often in an opposite direction from the flow direction of the original reactants. The pyrolysis reactor system includes one or more hot or heated regions or reaction zones, and preferably a lower temperature quenching zone that serves to absorb heat from the reacted product to quench the reaction process. After cooling the reaction product, the heated quench zone may be cooled by reversing the direction of flow through the reactor and feeding new supply of materials through the quench zone to absorb the quench zone heat and carry that heat back to the reaction zone where the recovered heat is conserved and reused to pre-heat the reaction zone and reactant materials. After reaction of the pre-heated reactants, the reactor is "regenerated" and ready to pyrolyze the hydrocarbonaceous reactant material (including any diluents or co-feeds) flowing through the reactor system.

At least a portion of the feedstock that is transferred to or fed into the reactor system is, generally, (i) pyrolyzed (e.g., cracked) in the reaction zone to form the pyrolysis product (e.g., olefins, aromatics, and/or acetylene), and (ii) that cracked reaction product from (i) is quenched in the quenching zone to stop the reaction at the desired pyrolysis product step to thereby yield the pyrolysis product. If the reaction is not timely quenched and stopped, the reaction may continue decomposing the molecules into coke, elemental components, or other less desirable reaction product components.

Separated but simultaneous introduction of two or more reactants into the reactor system, such as through separate flow channels, can facilitate deferred reaction or combustion of the reactants until they are combined with each other, within the desired reactor zone to react with each other within that designated zone. Thereby, a heat bubble may be controllably and repeatedly positioned within the reactor system. In some embodiments, the reverse flow regenerative reactor may be described as comprising two zones or reactors: (1) a heat recuperating (first) zone/reactor, such as for quenching; and (2) a reforming (second) zone/reactor, such as for pyrolysis reaction and reforming. (The first and second reactors need not necessarily be separate components, but instead may be merely different sections of a common reactor or reactor system. The terms first reactor and second reactor are merely used for simplification and to aid in discussion.) In some embodiments, a reactant mixer may be provided intermediate the first and second reactors to assist with mixing and reacting of the separately introduced reactants. As a catalyst is preferably not required to facilitate reforming the hydrocarbon vapor to acetylene, in most preferred embodiments no catalyst is present in the reactor beds. However, there may be some applications that benefit from the presence of a catalyst within the reactor system to achieve a certain range of reforming performance and such embodiments are within the scope of the invention.

The requisite high temperature required for many pyrolysis reactions may be achieved by creating a high-temperature heat bubble in the middle of the reactor system or within one of the reactors of the reactor system, such as in packed or monolithic bed system. This heat bubble may be created via a two-step process wherein heat is (1) added to the reactor bed via delayed or deferred, in-situ combustion, and then (2) removed from the bed via in-situ endothermic reforming. A key benefit of the invention is the ability to consistently manage and confine the high temperature bubble (e.g., $\geq 1500°$ C.) in a reactor region(s) that comprise the inventive stabilized zirconia and can tolerate such conditions long term. The inventive apparatus and process enable operation of a substantially continuously operating, large-scale, cyclic, commercial regenerative reactor system.

Figure 1B:
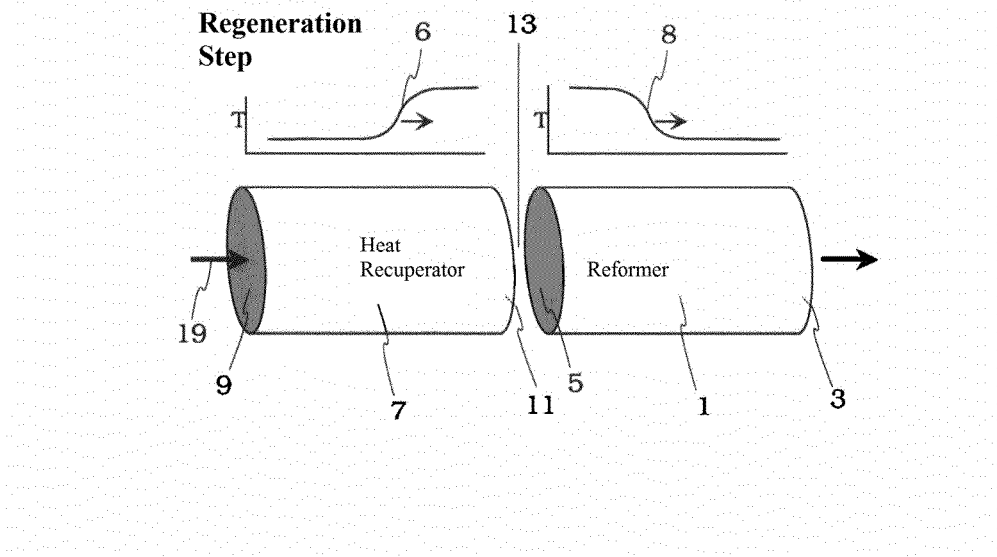

One generalized embodiment of a basic two-step asymmetric cycle regenerative reactor system according to the present invention is depicted in FIGS. 1a and 1b, illustrating a reactor system including two zones/reactors; a first reactor or recuperator/quenching zone (7) and a second reactor or reaction/reforming zone (1). In some embodiments, at least the highest temperature reactor, generally the second reactor, but in other embodiments both of the reactors (7) and (1), that is both the reaction zone (1) and the recuperator zone (7), comprise components fabricated with the inventive refractory material. The inventive material may be provided, for example, in one or more regenerative reactor beds that are useful for carrying out a high temperature chemical reaction. The inventive refractory material may be used in construction of one or more embodiments, components, or regions of the reactor system, and may be of substantially any form or shape, such as but not limited at least one of spheres, beads, honeycomb materials, a tube, pipe, U-tube, fluid mixer, nozzle, extruded monolith, brick, tile, catalyst tray, reactor tray, tray component, valves, and/or other refractory components that are exposed to high temperature. Additionally, if desired for some embodiments, the reactor system may also comprise other refractory materials in addition to the inventive materials, in reactor regions that are not exposed to the most severe temperatures, such as glass or ceramic beads or spheres, metal beads or spheres, ceramics (including zirconia), ceramic or metal honeycomb materials, ceramic tubes, extruded monoliths, and the like, provided they are competent to maintain integrity, functionality, and withstand long term exposure to the relevant temperatures for that respective region of the reactor.

During the regeneration step, illustrated in FIG. 1(b), fuel and air may separately be channeled from a first end (19) of the first reactor (7) and then mixed as it exits the second end (11) or enters an optional mixing region (13), which may also include a mixer (not shown). The fuel and air mixture may cool the first reactor (7), producing a temperature gradient profile such as illustrated in graph (6). The mixed components preferably exothermically react (e.g., combust or burn) and the hot reaction product continues to pass into the second end (5) of the second reactor (1) and preferably through the second reactor (1) to exit the first end (3) of the second reactor. The hot reaction product may produce a temperature gradient through the second reactor (1), such as illustrated by graph (8). Then the process reverses (as illustrated in FIG. 1(a)) and one or more pyrolysis reaction feed materials (15) may be fed through the second reactor (1) to pyrolyze the feed, which is then cooled through the optional mixer and through the quenching, first reactor (7). Exemplary temperature profiles are illustrated in graphs (2) and (4).

FIG. 2 illustrates another simplified, exemplary, reactor system such as may be suitable in some applications for pyrolyzing hydrocarbon feed. The exemplary reactor is described in more detail in U.S. provisional patent application Ser. No. 60/933,044, filed Jun. 4, 2007, the entirety of which is incorporated herein. The reactor system of FIG. 2 is illustrative of any of a wide variety of more specific reactor designs that segregate the conveyance of each of two reactants from each other until the reactants reach a designated zone within the reactor system where they mix and react with each other. Such process and apparatus is particularly useful for deferring the exothermic reaction or combustion of reactants such as fuel and oxidant that provide the heat necessary to heat the pyrolysis zone. The inventive reactor system may utilize inventive material components in all regions of the reactor that may be subjected to the extreme temperatures, such as temperatures in excess of 1200° C., or 1400° C., or 1500° C., or even in excess of 1700° C. In some applications, the inventive material may be useful, for example in applications having temperatures of in excess of 1700° C. and in some other applications the material may be useful in the presence of temperatures in excess of 1800° C., such as up to 2000° C. or up to 2200° C.

FIG. 2 depicts an exemplary reactor system, operating in the heating or "regeneration" heat cycle. The illustrated reactor system comprises two reactors or zones within the system. In the heating cycle, the recuperator reactor (27) serves to separately convey each of reactants (30) and (32) through separate, substantially isolated flow paths or channels (28) and (33) through the reactor without mixing or incurring reaction or combustion until the reactants arrive proximate the reactor core, such as within or near mixer (44). After the reactants combine in or near the mixer (44), exothermic reaction heat is generated, thereby heating the reactor system, preferably to at least 1500° C., and in one embodiment heating particularly the second reactor (21) as the reactants move into and through the second reactor (21). FIG. 2 also illustrates one embodiment of a gas distributor (31) for dispersing one of the two reaction gases to desired locations about the end (29) of the reactor (27), while a separate distributor (30) separately conveys the other reactant into the first reactor (27). In a second or reversed phase of the reaction cycle (not illustrated in FIG. 2, but generally illustrated in FIG. 1(a)), a hydrocarbon feedstock is fed into the heated second reactor (21) (reformer) for pyrolysis of the hydrocarbon feed therein. The heated second reactor (21) is the reactor wherein a majority of the regeneration heating and volatized hydrocarbon reformation or pyrolysis occurs.

Although the first (27) and second reactors (21) in FIG. 2, or (7) and (1) respectively in FIGS. 1(a) and 1(b), in the illustrated reactor system are represented and identified as separately distinguishable reactors, it is understood and within the scope of the present invention that the first and second reactors may be manufactured, provided, or otherwise combined or integrated into a common single reactor system or facility, whereby the reactor system might be described as comprising merely a single reactor facility that integrates substantially the full extent of both reactors and reactor cycles within the reactor system. The terms "first reactor" and "second reactor" are utilized for simplified explanation purposes and merely refer to the respective zones within the reactor system whereby each of the regeneration, reformation, quenching, etc., steps take place and do not require that separate reactors or components actually be utilized for the two reactors. Many embodiments will comprise a reactor system whereby the recuperator reactor includes conduits and channels as described herein, preferably formed from the inventive material to accommodate high temperature quenching. The reformer reactor is preferably also fabricated using the inventive material. A reactant mixer (44) may be provided intermediate the first and second reactors to facilitate good stoichiometric reaction and even heating. Other embodiments may include a reformer reactor bed that is arranged different from the recuperator bed. In some other embodiments, the reformer bed may comprise inventive materials that are different from the inventive materials that comprise the recuperator bed. Routine experimentation and knowledge of the volatized hydrocarbon pyrolysis art may be used to determine an effective reformer/second reactor design.

In a preferred embodiment of the present invention, a first reactant, such as a hydrocarbon fuel, is directed down one or more designated channels or conduits, while a second reactant, such as an oxygen-containing gas, is simultaneously directed down one or more other designated channels, through the reactor. During flow in the opposite direction, preferably both of the first and second sets of channels are simultaneously utilized to convey the pyrolyzed and likely expanded product volume through the recuperator reactor. In one embodiment, the channels are included in one or more honeycomb monolith type structures. The term "honeycomb monoliths" is defined broadly to include but not be limited to extruded, ceramic structures as are generally known in the reaction industry, such as in catalytic converters, etc., capable of conveying a fluid through the framework of channels. The term "honeycomb" is also used broadly herein to refer to any framework of channels, regardless of cross-sectional geometry, that includes multiple substantially parallel flow paths or channels and is not intended to limit the structure or shape to any particular geometric shape. The channels each may have generally any cross-sectional shape, although a generally symmetrical cross-sectional shape may be preferred. Each monolith may include a single channel, a few channels, or multiple channels, e.g., tens, hundreds, or even thousands of channels, depending upon the size of the particular monoliths and reactors utilized therein. For example, in one embodiment, the conduits may have a diameter of only a few millimeters, or about one millimeter, or several millimeters and even several centimeters in diameter in some vessels. A reactor may comprise a single, a few, or even numerous monoliths. The monoliths may be further arranged into cells or groups of monoliths, wherein each cell or a group of cells is dedicated to conducting one of the two simultaneously conveyed materials, while another group of cells conveys the other material. A preferred monolith arrangement will provide low pressure loss or drop during reactant or product transference, while providing necessary product contact time and heat transfer during conductance. The arrangement preferably also provides adequate mixing of the conveyed materials after exiting the monoliths, such as in or near the reaction zone. In addition to providing a flow conduit, the channels also facilitate effective material isolation barriers (e.g., function such as conduit walls) to prevent cross flow or mixing between the first and second reactants and maintain a majority of the reactants effectively separated from each other until mixing is permitted. In some preferred embodiments of the present invention, the reactors are comprised of one or more extruded honeycomb monoliths.

In some embodiments, the inventive materials and components preferably provide a conduit packing with an average wetted surface area per unit volume that ranges from about 50 $ft^{-1}$ to about 3000 $ft^{-1}$, more preferably from about 100 $ft^{-1}$ to 2500 $ft^{-1}$, and still more preferably from about 200 $ft^{-1}$ to 2000 $ft^{-1}$, based upon the volume of the first reactor that is used to convey a reactant. Such wetted area values apply to the channels for both of the first and second reactants, with relatively thin walls separating the channels to facilitate good heat transfer between the reactants and the inventive material. The term "thin walls" refers to the distance through which heat must be moved within the solid portions of the component. Thus, for a bed of spherical packing would simply be the sphere diameter. For a reactor bed comprising honeycomb monolith structures, the relevant dimension is simply the wall thickness separating the flow channels. Exemplary wall thickness of some honeycomb monoliths according to the present invention is less than 2.5 mm, frequently less than 1.0 mm, down to a probable minimum wall thickness of not less than around 0.1 mm. These relatively thin walls are enabled by the strength and thermal shock resistance properties of the inventive material, as discussed previously herein and in related patent applications. The durable, stable, corrosion resistant and heat resistant material is ideal at enabling use of thin but strong reactor channel or wall components. The relatively high density also helps mitigate reactant cross-flow through the conduit or channel walls. The relatively high surface area per unit volume values facilitated by the high number of relatively small reactant channel or conduits are likely preferred for many embodiments to aid achieving a relatively quick change in the temperature through the reactor, such as generally illustrated by the relatively steep slopes in the exemplary temperature gradient profile graphs, such as in FIGS. 1(a), and 1(b). The quick temperature change is preferred to permit relatively quick and consistent heating and quenching of the reaction to prevent the reaction from continuing and creating coke. The relatively high thermal stability, high thermal shock resistance, and high heat transfer capability of stabilized zirconia also enables these desired quick temperature changes, without experiencing material failure due to thermal shock degradation. The prescribed zirconia is highly resistant to such degradation and to ceramic corrosion.

In some embodiments, a reactor will provide media channels and other high temperature-exposed components and packing that includes a high volumetric heat transfer coefficient (e.g., greater than or equal to 0.02 $cal/cm^3 s° C.$, preferably greater than about 0.05 $cal/cm^3 s° C.$, and most preferably greater than 0.10 $cal/cm^3 s° C.$), with corresponding low resistance to flow (low pressure drop), have operating temperature range consistent with the highest temperatures encountered during regeneration, have high resistance to thermal shock, and have high bulk heat capacity (e.g., at least about 0.10 $cal/cm^3° C.$, and preferably greater than about 0.20 $cal/cm^3° C.$). As with the high surface area values, these relatively high volumetric heat transfer coefficient values, high strength (MOR), and other properties provided by the inventive stabilized zirconia are also likely preferred for many embodiments to aid in achieving a relatively quick change in the temperature through the reactor, such as generally illustrated by the relatively steep slopes in the exemplary temperature gradient profile graphs, such as in FIGS. 1(a), 1(b), and 6. The quick temperature change permits relatively quick and consistent quenching of the reaction to prevent the reaction from continuing too long and creating coke or carbon buildup.

Some embodiments may use the inventive materials and components for uses other than the described and often preferred honeycomb monoliths, such as whereby the channel conduits/flow paths are substantially linear and tubular. Other alternative embodiments may include more tortuous pathways (e.g. convoluted, complex, winding and/or twisted but not linear or tubular) through a component, than the previously described monoliths, including but not limited to labyrinthine, variegated flow paths, conduits, tubes, slots, and/or a void structure having channels through a portion(s) of the reactor and may include barrier portion, such as along an outer surface of a segment or within sub-segments, having substantially no effective permeability to gases, and/or other means suitable for preventing cross flow between the reactant gases and maintaining the first and second reactant gases substantially separated from each other while axially transiting the recuperator (27). For such embodiments, the complex flow path may create a lengthened effective flow path, increased surface area, and improved heat transfer. Such design may be preferred for reactor embodiments having a relatively short axial length through the reactor. Axially longer reactor lengths may experience increased pressure drops through the reactor. However for such embodiments, the porous and/or permeable media may include, for example, at least one of a packed bed, an arrangement of tiles, a permeable solid media, a substantially honeycomb-type structure, a fibrous arrangement, and a mesh-type lattice structure. It may often be preferred that the zirconia matrix provides high surface area to facilitate good heat exchange with the reactant and produced gases.

Typical conditions may include a residence time from 0.001 to 1.0 seconds and may typically include, for example, a pressure from about 5 to 50 psia (34 to 345 kPa). In some embodiments, the reactor conditions may be at a vacuum pressure, such as less than 15 psia (103 kPa). For purposes of this discussion, the term "residency time" refers to the time exposed to temperatures typically in excess of about 1200° C. For example, in many useful reactors, the residency time at such temperature, and more preferably at temperatures in excess of 1500° C., is preferably less than about 0.005 seconds, such as within a range of from 0.001 to 0.010 seconds, but more preferably within a range of from 0.001 to about 0.005 seconds. However, the total time in the reactor bed system could be longer, such as on order of 0.030 seconds or greater, depending upon the quenching process and reactor channel length. Cracked pyrolysis product may be removed from the reactor system, such as via lines 49 and/or 51 and transferred to other processes for recovery of the various component products of the cracked product. The reactor system may also include additional feed lines (not shown) such as fuel and oxidant feed, stripping agent feed, exhaust lines, etc.

The regenerative pyrolysis reactor system may heat the hydrocarbon feedstock to temperatures in excess of 1200° C., preferably in excess of 1500° C., more preferably in excess of 1700° C. In some reactions, it may even be preferable to heat the feeds for very short time duration, such as less than 0.1 seconds, to a temperature in excess of 1800° C. or even in some instances in excess of 2000° C. An exemplary preferred process may pyrolyze the feed stream within the reactor, such as at temperatures of from 1500° C. to 2000° C., or from 1500° C. to 1900° C., and sometimes preferably from 1600° C. to 1700° C. Exemplary residency times preferably may be short, such as less than 0.1 seconds and preferably less than 5 milliseconds. In some aspects, the conversion or cracking of the separated vapor phase may be performed in the presence of hydrogen, hydride, other hydrocarbons, and/or other diluents or stripping agents. The conversion of the vapor fraction into higher value hydrocarbons such as acetylene typically requires a high reformation temperature, which in the past has been a significant barrier to commercialization and efficiency.

In one preferred embodiment, the reactor component providing conduits or channels comprise stabilized zirconia materials that provide the necessary heat transfer capacity to create the temperature profiles (4) and (8) illustrated in FIG. 1, at the space velocity conditions of operation. Adequate heat transfer rate is characterized by a heat transfer parameter $\Delta T_{HT}$, below about 500° C., more preferably below about 100° C., and most preferably below about 50° C. The parameter $\Delta T_{HT}$, as used herein, is the ratio of the bed-average volumetric heat transfer rate that is needed for recuperation, to the volumetric heat transfer coefficient of the bed, $h_v$. The volumetric heat transfer rate (e.g. cal/cm$^3$ sec) that is sufficient for recuperation is calculated as the product of the gas flow rate (e.g. gm/sec) with the gas heat capacity (e.g. ca./gm° C.) and desired end-to-end temperature change (excluding any reaction, e.g. ° C.), and then this quantity divided by the volume (e.g. cm$^3$) of the recuperator zone (27) traversed by the gas. The $\Delta T_{HT}$ in channel (28) is computed using gas (30), channel (33) with gas (32), and total recuperator zone (27) with total gas. The volumetric heat transfer coefficient of the bed, $h_v$, is typically calculated as the product of a area-based coefficient (e.g. cal/cm$^2$s° C.) and a specific surface area for heat transfer ($a_v$, e.g. cm$^2$/cm$^3$), often referred to as the wetted area of the packing.

Typical conditions may include a residence time of from 0.001 to 1.0 seconds and may typically include, for example, a pressure from about 5 to 50 psia (34 to 345 kPa). In some embodiments, the reactor conditions may be near atmospheric pressure, such as from about 13 to about 25 psia (90 to 172 kPa), and in other embodiments at a vacuum pressure, such as less than 15 psia (103 kPa). Cracked pyrolysis product may be removed from the reactor system and transferred to other processes for recovery of the various component products of the cracked product. In addition to the hydrocarbon feed to be cracked, the reactor system may also include additional feeds, such as fuel, oxidant, steam, hydrogen, or other hydrocarbon co-reactants, or other co-feeds. In some aspects, the conversion or cracking of the hydrocarbon feed may be performed in the presence of hydrogen, hydrides, other hydrocarbons, and/or other diluents or stripping agents.

EXAMPLE 1

A comparative ceramic composition was prepared by mixing 100 wt. % of TZ-8YS powder (Tosoh Co., fully stabilized zirconia containing 8 mol. %, i.e. 13.3 wt. % yttria). A processing agent was added and about 2 wt. % binder wax was added to the mixed ceramic powder to provide green strength during forming process. The powder was pressed into a disc shape in the size of about 3" diameter×0.5" thickness. The pressed green body was then sintered at about 1600° C. to form a mixer ceramic body. The resultant ceramic body comprised:
  i) 100 wt. % fully stabilized zirconia with yttria concentration of 13.3 wt. %.
  ii) 10 vol. % porosity.

After testing the SSYM F1 mixer sample in a reverse-flow reactor, the fully stabilized zirconia with yttria concentration of 13.3 wt. % revealed carbide-oxide ceramic corrosion.

EXAMPLE 2

Another comparative ceramic composition was prepared by mixing 20 wt. % Amperit 831 powder (H. C. Starck's), 70 wt. % TZ-10YS powder (Tosoh Co., fully stabilized zirconia containing 10 mol. % (18 wt. %) yttria) and 10 wt. % pure yttria powder (Alfa Aesar). A processing agent was added and about 2 wt. % binder wax was added to the mixed ceramic powder to provide green strength during forming process. The powder was pressed into a disc shape in the size of about 3" diameter×0.5" thickness. The pressed green body was then sintered at about 1600° C. for four hours to form a mixer ceramic body. The resultant ceramic body comprised:
  i) 100 wt. % fully stabilized zirconia with yttria concentration of 20.9 wt. %.
  ii) 10 vol. % porosity.

After testing the SSYM F4 mixer sample in a reverse-flow reactor, the fully stabilized zirconia with yttria concentration of 20.9 wt. % revealed mild but still observable levels of carbide-oxide ceramic corrosion. The observed corrosion level was determined however, to represent the upper limit of inadequate yttria concentration (20.9 wt. %).

EXAMPLE 3

A ceramic composition was prepared by mixing 70 wt. % of 2000 μm D50 coarse grit of partially stabilized zirconia powder (Zircoa 2290 powder, including 5 wt. % $Y_2O_3$ stabilizer, from Zircoa Inc.) and 30 wt. % of second grit $Y_2O_3$ powder (1 μm average particle size, 99.9%, from Alfa Aesar). About 2 wt. % binder wax was added to the mixed ceramic powder to provide green body strength during forming process. The powder was pressed into a disc shape in the size of about 3" diameter×0.5" thickness. The pressed green body was then sintered at about 1600° C. for four hours to form a mixer ceramic body. The resultant ceramic body comprised:
  i) 50 wt. % partially stabilized zirconia with yttria concentration of 14.4 wt. %.
  ii) 40 wt. % fully stabilized zirconia with yttria concentration of 44.7 wt. %.
  iii) 10 wt. % fully stabilized zirconia with yttria concentration of 82.2 wt. %.
  iv) 15 vol. % porosity.

Since relatively coarse partially stabilized zirconia grit was utilized as a raw material, the sintered ceramic body contained many inhomogeneous grains containing various amounts of yttria. After testing the produced sample in a reverse-flow reactor, the grains containing about 44.7 wt. % yttria and 82.2 wt. % yttria revealed no signs of carbide-oxide ceramic corrosion, but the grains containing 14.4 wt. % yttria revealed carbide-oxide ceramic corrosion.

EXAMPLE 4

A ceramic composition was prepared by mixing 80 wt. % TZ-10YS powder (Tosoh Co., fully stabilized zirconia containing 10 mol. % (18 wt. %) yttria) and 20 wt. % pure yttria powder (1 μm D50 particle size, 99.9%, Alfa Aesar). The mixed ceramic powder was further compounded into an extrusion batch comprising an organic binder, processing agent and solvent. The batch was then extruded into a green honeycomb body, dried and fired at about 1575° C. for 4 hrs to form a honeycomb monolith ceramic body. The resultant ceramic body comprised:
 i) 80 wt. % fully stabilized zirconia with yttira concentration of 18.1 wt. %.
 ii) 15 wt. % fully stabilized zirconia with yttira concentration of 20.2 wt. %.
 iii) 5 wt. % fully stabilized zirconia with yttira concentration of 33.2 wt. %.
 iv) 10 vol. % porosity.

Since the ceramic body was not fully homogenized during powder mixing and sintering, it contained many inhomogeneous grains containing various amounts of yttria. After testing the produced sample in a reverse-flow reactor, the grains containing 18.1 wt. % and about 20.2 wt. % yttria revealed some mild carbide-oxide ceramic corrosion, but the grains containing about 33.2 wt. % yttria exhibited no signs of carbide-oxide ceramic corrosion.

One conclusion drawn from the above experiments and numerous other experiments not included herein, confirmed that yttria concentrations of less than about 21 wt. % yttria consistently exhibited varying degrees of an unacceptable level of carbide-oxide corrosion. However, it was determined that 21 wt. % yttria is the threshold lower yttria concentration for production of stabilized zirconia ceramic compositions that are acceptably resistant to such corrosion, with progressively improved results observed with increasing levels of yttria, such as in excess of 22 wt. %, or in excess of 25 wt. %, or in excess of 30 wt. % yttria.

While the present invention has been described and illustrated with respect to certain embodiments, it is to be understood that the invention is not limited to the particulars disclosed and extends to all equivalents within the scope of the claims. Unless otherwise stated, all percentages, parts, ratios, etc. are by weight. Unless otherwise stated, a reference to a compound or component includes the compound or component by itself as well as in combination with other elements, compounds, or components, such as mixtures of compounds. Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

What is claimed is:

1. A ceramic corrosion resistant pyrolysis reactor system comprising:
 a first reactor and a second reactor in flow communication with said first reactor, at least one of said first reactor and said second reactor comprising a refractory material comprising an yttria stabilized zirconia, said refractory material comprising at least 21 wt. % yttria based upon the total weight of said refractory material,
 wherein said refractory material comprises:
 (i) at least 20 wt. % of a first grain mode based upon the total weight of said refractory material, said first grain mode comprising yttria stabilized zirconia having a D50 grain size in the range of from 5 to 2000 μm, said first grain mode comprising at least 6 wt. % yttria based upon the weight of said first grain mode; and
 (ii) at least 1 wt. % of second grain mode having a D50 grain size in the range of from 0.01 μm up to not greater than one-fourth the D50 grain size of said first grain mode stabilized zirconia, based upon the total weight of said refractory material, said second grain mode comprising at least 14 wt. % yttria based upon the weight of said second grain mode.

2. The reactor system of claim 1, wherein said refractory material has porosity at 20° C. in the range of from 5 to 28 vol. % based upon the volume of said refractory material.

3. The reactor system of claim 1, wherein said refractory material comprises at least a first grain mode including yttria stabilized zirconia and a second grain mode comprising yttria.

4. The reactor system of claim 1, wherein said first grain mode comprising at least 14 wt. % yttria based upon the weight of said first grain mode.

5. The reactor system of claim 1, wherein reactor system further comprises:
 (i) said first reactor further comprises a first channel for conveying a first reactant through said first reactor and a second channel for conveying a second reactant through said first reactor, the first reactant exothermically reacting with the second reactant to generate heat;
 (ii) said second reactor is heated by said heat to a temperature of at least 1500° C. for pyrolyzing a hydrocarbon feedstock in said second reactor, wherein said second reactor comprises said refractory material comprising yttria stabilized zirconia comprising at least 21 wt. % yttria based upon the total weight of said stabilized zirconia and porosity of from 5 vol. % to 28 vol. % based upon the volume of said refractory material.

6. The reactor system of claim 1, wherein said reactor system comprises a regenerative reactor system.

7. The reactor system of claim 1, further comprising a reactant mixer positioned intermediate said first reactor and said second reactor to combine at least a portion of said first reactant with at least a portion of said second reactant, said reactant mixer comprising said reactor material.

8. The reactor system of claim 1, wherein said refractory material includes yttria and/or yttria stabilized zirconia, at least one of said yttria and/or said yttria stabilized zirconia having a D50 grain size in the range of from 0.01 μm to 2000 μm.

9. The reactor system of claim 1, wherein said yttria stabilized zirconia comprises yttria and/or zirconia grains having a D50 grain size in the range of from 5 to 800μm.

10. A ceramic corrosion resistant pyrolysis reactor system comprising:
 a first reactor and a second reactor in flow communication with said first reactor, at least one of said first reactor and said second reactor comprising a refractory material comprising an yttria stabilized zirconia, said refractory material comprising at least 21 wt. % yttria based upon the total weight of said refractory material,
 wherein (a) said refractory material includes yttria and/or yttria stabilized zirconia, at least one of said yttria and/or said yttria stabilized zirconia having a D50 grain size in the range of from 0.01 μm to 2000 μm, and (b) said refractory material comprises at least a first grain mode including yttria stabilized zirconia and a second grain mode comprising yttria.

11. The reactor system of claim 10, wherein said refractory material has porosity at 20° C. in the range of from 5 to 28 vol. % based upon the volume of said refractory material.

12. The reactor system of claim 10, wherein reactor system further comprises:
 (i) said first reactor further comprises a first channel for conveying a first reactant through said first reactor and a second channel for conveying a second reactant through said first reactor, the first reactant exothermically reacting with the second reactant to generate heat;
(ii) said second reactor is heated by said heat to a temperature of at least 1500° C. for pyrolyzing a hydrocarbon feedstock in said second reactor, wherein said second reactor comprises said refractory material comprising yttria stabilized zirconia comprising at least 21 wt. % yttria based upon the total weight of said stabilized zirconia and porosity of from 5 vol. % to 28 vol. % based upon the volume of said refractory material.

13. The reactor system of claim 10, wherein said reactor system comprises a regenerative reactor system.

14. The reactor system of claim 10, further comprising a reactant mixer positioned intermediate said first reactor and said second reactor to combine at least a portion of said first reactant with at least a portion of said second reactant, said reactant mixer comprising said reactor material.

15. The reactor system of claim 10, wherein said yttria stabilized zirconia comprises yttria and/or zirconia grains having a D50 grain size in the range of from 5 to 800 μm.

16. A ceramic corrosion resistant pyrolysis reactor system comprising:
a first reactor and a second reactor in flow communication with said first reactor, at least one of said first reactor and said second reactor comprising a refractory material comprising an yttria stabilized zirconia, said refractory material comprising at least 21 wt. % yttria based upon the total weight of said refractory material,
wherein said yttria stabilized zirconia comprises yttria and/or zirconia grains having a D50 grain size in the range of from 5 to 800 μm.

17. The reactor system of claim 16, wherein said refractory material has porosity at 20° C. in the range of from 5 to 28 vol. % based upon the volume of said refractory material.

18. The reactor system of claim 16, wherein said refractory material comprises at least a first grain mode including yttria stabilized zirconia and a second grain mode comprising yttria.

19. The reactor system of claim 16, wherein reactor system further comprises:
(i) said first reactor further comprises a first channel for conveying a first reactant through said first reactor and a second channel for conveying a second reactant through said first reactor, the first reactant exothermically reacting with the second reactant to generate heat;
(ii) said second reactor is heated by said heat to a temperature of at least 1500° C. for pyrolyzing a hydrocarbon feedstock in said second reactor, wherein said second reactor comprises said refractory material comprising yttria stabilized zirconia comprising at least 21 wt. % yttria based upon the total weight of said stabilized zirconia and porosity of from 5 vol. % to 28 vol.% based upon the volume of said refractory material.

20. The reactor system of claim 16, wherein said reactor system comprises a regenerative reactor system.

21. The reactor system of claim 16, further comprising a reactant mixer positioned intermediate said first reactor and said second reactor to combine at least a portion of said first reactant with at least a portion of said second reactant, said reactant mixer comprising said reactor material.

* * * * *